US008256668B2

(12) United States Patent
Bennett et al.

(10) Patent No.: US 8,256,668 B2
(45) Date of Patent: Sep. 4, 2012

(54) ONLINE PURCHASING SYSTEM SUPPORTING LENDERS WITH AFFORDABILITY SCREENING

(76) Inventors: James D. Bennett, Laguna Beach, CA (US); Christopher C. Winslade, Chicago, IL (US)

( * ) Notice: Subject to any disclaimer, the term of this patent is extended or adjusted under 35 U.S.C. 154(b) by 0 days.

(21) Appl. No.: 13/224,052

(22) Filed: Sep. 1, 2011

(65) Prior Publication Data

US 2011/0313913 A1 Dec. 22, 2011

Related U.S. Application Data

(63) Continuation of application No. 09/808,722, filed on Mar. 14, 2001, now Pat. No. 8,036,941.

(60) Provisional application No. 60/190,825, filed on Mar. 21, 2000, provisional application No. 60/214,183, filed on Jun. 26, 2000, provisional application No. 60/213,912, filed on Jun. 26, 2000, provisional application No. 60/214,136, filed on Jun. 26, 2000.

(51) Int. Cl.
*H04M 15/00* (2006.01)
(52) U.S. Cl. .......................................... 235/380; 705/38
(58) Field of Classification Search .................. 705/26.1, 705/35, 36, 38, 39, 67, 79; 235/375, 376, 235/379, 380; 713/182
See application file for complete search history.

(56) References Cited

U.S. PATENT DOCUMENTS

| 6,175,922 | B1 * | 1/2001 | Wang ............................. 713/182 |
| 6,324,524 | B1 * | 11/2001 | Lent et al. ........................ 705/38 |
| 6,405,181 | B2 * | 6/2002 | Lent et al. ........................ 705/38 |
| 6,567,791 | B2 * | 5/2003 | Lent et al. ........................ 705/38 |
| 6,970,852 | B1 * | 11/2005 | Sendo et al. .................... 705/67 |
| 7,143,063 | B2 * | 11/2006 | Lent et al. ........................ 705/38 |
| 7,505,939 | B2 * | 3/2009 | Lent et al. ........................ 705/38 |
| 7,539,628 | B2 * | 5/2009 | Bennett et al. ............. 705/26.41 |
| 7,908,226 | B2 * | 3/2011 | Hutchison et al. .............. 705/79 |
| 7,942,316 | B2 * | 5/2011 | Bennett et al. ................ 235/379 |
| 8,036,941 | B2 * | 10/2011 | Bennett et al. ............... 705/26.1 |

* cited by examiner

*Primary Examiner* — Andrew Joseph Rudy
(74) *Attorney, Agent, or Firm* — McAndrews, Held & Malloy, Ltd.

(57) ABSTRACT

An online system uses, in various embodiments of the invention, credit report information, loan affordability screening and credit approval and management functionality to facilitate the purchase and finance of products online. The online system may include both sellers of products and lenders that offer financing to buyers seeking to purchase the products. The system may automatically obtain a buyer's credit report information and use that information to determine if the buyer is pre-approved, for example, to obtain financing for a particular product or products. The system also enables use of buyer credit information to identify only those of a seller's products for which the buyer is pre-approved, for example, to finance using one or more loans. The system then enables selection of an identified product or products for purchase, and selection of a loan, for example, for financing of the selected product or products. Credit approval (or pre-approval) may be performed automatically, and along with credit processing, may be performed completely online.

17 Claims, 20 Drawing Sheets

ONLINE PURCHASING SYSTEM SUPPORTING LENDERS WITH AFFORDABILITY SCREENING

CROSS-REFERENCE TO RELATED APPLICATIONS

The present application is a continuation of application Ser. No. 09/808,722, which was filed on Mar. 14, 2001 now U.S. Pat. No. 8,036,941, and which claims priority to and the benefit of Provisional Application Ser. No. 60/190,825, filed Mar. 21, 2000, Ser. No. 60/214,183, filed Jun. 26, 2000 and Ser. No. 60/213,912, filed Jun. 26, 2000. Each of these applications, along with Provisional Application Ser. No. 60/214,136 filed Jun. 26, 2000 and Ser. No. 60/213,912, is hereby incorporated by reference herein in its entirety.

INCORPORATION BY REFERENCE

U.S. provisional application Ser. No. 60/190,825 filed Mar. 21, 2000, Ser. No. 60/214,183 filed Jun. 26, 2000, Ser. No. 60/214,136 filed Jun. 26, 2000, Ser. No. 60/213,912 filed Jun. 26, 2000, and Ser. No. 60/214,188 filed Jun. 26, 2000 are all hereby incorporated by reference herein in their entirety.

STATEMENT REGARDING FEDERALLY SPONSORED RESEARCH

N/A

BACKGROUND

1. Technical Field

The present invention relates generally to an online purchasing system; and, more particularly, it relates to an online affordability-based purchasing system that is operable to perform screening, filtering, and analysis for purchases and potential purchases among various lenders and sellers of good(s) and/or service(s).

2. Related Art

Conventional loan approval methods are time-consuming and often involve a considerable amount of wasted effort on the part of buyers, sellers and lenders alike. Typically, when a buyer desires to finance a purchase, the buyer initially spends a significant amount of time researching and analyzing various products, often with the assistance of a seller, before selecting a desired product. The buyer then typically spends additional time researching and analyzing various loans of one or more lenders, again often with the assistance of a seller, before selecting a desired loan. The buyer provides the lender or seller with extensive personal financial information, which the lender or seller uses to calculate whether or not the buyer is qualified to finance the selected product with the selected loan.

If the buyer is not qualified, as is often the case, the buyer must select a different product, a different loan, or both, requiring that the entire time-consuming process be repeated. In many cases, the buyer and the lender or seller undertake several iterations of the process before achieving loan approval.

In addition, once loan approval is finally achieved using conventional methods, the seller is not able to upsell without having to start over. In other words, if a seller desires to sell upgrades for a selected product or a more expensive product, the buyer and seller must again undertake the entire time-consuming loan approval process before knowing whether the buyer qualifies to finance the upgrades or the more expensive product.

Conventional loan approval methods are also rigid, requiring that the same steps be performed regardless of the type of product the buyer seeks to finance. Such methods do not permit the seller or lender to modify loan approval processing, or perform different processing altogether, depending on the type of product sought to be financed.

Obtaining loan approval using conventional methods is also very labor-intensive. This is particularly true in situations where the seller is assisting the buyer in the loan approval process without lender involvement. Ordinarily in such situations, sellers associate with one or more lenders, and obtain loan parameters from each lender. The seller uses these parameters in calculating, often manually using an adding machine or calculator, to determine whether or not the buyer qualifies for a particular loan. Lenders modify their parameters regularly, forcing the seller to keep track of all modifications. In some instances, a seller approves a buyer for a particular loan, only to find out later that the parameters used for approval are no longer valid. The seller must then recalculate whether or not the buyer is approved using modified parameters, and if not, select a different lender and/or loan, or have the buyer select a different product entirely, to ultimately achieve loan approval. The process is time-consuming and often frustrating for both the seller and the buyer.

Also, in such situations where a seller is assisting a buyer in the loan approval process without lender involvement, the buyer is often unknowingly placed in an adverse financial position relative to the seller. Specifically, a seller typically receives a percentage of the financial amount (i.e., points) for originating a loan with a lender. As mentioned above, a seller usually associates with multiple lenders, and will attempt to "sell" to the buyer a loan that provides the seller with the greatest amount of points, regardless of whether the interest rate or other parameters of the loan are the best available to the buyer. Conventional loan approval methods do not provide financial incentive to the seller to identify and present loans most favorable to the buyer.

Conventional online loan platforms also suffer from similar problems. For example, such platforms typically provide a buyer with a credit application that, upon completion and submission by the buyer, is forwarded to a lender or lenders. The application is not processed in real time, but instead is placed in queue where it is eventually processed by a loan officer, often several hours to several days later. The buyer must wait for a response from each lender, and is not permitted to ascertain the effect that varying loan parameters may have on the amount the buyer is qualified to finance. If a buyer desires to modify the down payment amount or the loan term, the buyer must start all over again by completing and submitting another application. The delay inherent in such online platforms often causes buyers to simply walk away from the purchase.

Even those conventional online loan platforms that claim to offer "automated loan processing" still typically only provide a buyer with means for automated data entry. These platforms still typically require participation by a loan officer, and still take several hours to several days for loan approval.

Further limitations and disadvantages of conventional and traditional systems will become apparent to one of skill in the art through comparison of such systems with the present invention as set forth in the remainder of the present application with reference to the drawings.

SUMMARY OF THE INVENTION

Aspects of the present invention may be found in a credit management system that comprises a first web server used by an individual, such as a buyer, seller or lender, for example, to generate, via a web page on a computer, a credit application for a buyer. The first web server may be that used by a single seller's sales site or by a single lender, or may be that of a third party multi-seller sales system or multi-lender system, for example. The computer responds to completion of the application and input by the individual to cause the credit application to be analyzed based on one or more credit approval criteria. The analysis may be associated with the first web server, or a second web server associated with a third party loan approval portal, for example. In either case, the web server automatically communicates an approval of the credit application to the computer if the credit application meets the one or more credit approval criteria. In other words, there is no need for human intervention.

The first web server or the second web server may obtain credit report information about the buyer from a third web server, using all or a portion of the credit application. The third web server may be that of a credit reporting agency, for example. The credit report information, or some portion of it, may then be used, along with the credit application (or some portion of it) and the credit approval criteria, to make the determination of whether or not to approve the credit application. The computer may then display an indication to the individual of approval (or non-approval).

In one embodiment, the indication is contained in an email, or in a web page (or pages) that is communicated from the first web server (or the second web server, if relevant) to the computer. In either case, the indication may be a credit offer. The individual may then, via response to the email or via the web page delivered, communicate an acceptance of the credit offer.

The relevant web server may store the credit application and an indication of the approval of the application in a database. The credit application may then be deleted if an acceptance of the credit offer is not received within a predetermined time period.

In one embodiment, a risk factor is calculated based on the submitted credit application and compared against one or more risk guidelines to make the determination whether or not to approve the application. In this case, the risk guideline may automatically be updated based on the risk factor calculated when the offer is accepted.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments are considered in conjunction with the following drawings.

DETAILED DESCRIPTION OF THE INVENTION

Figure 1:
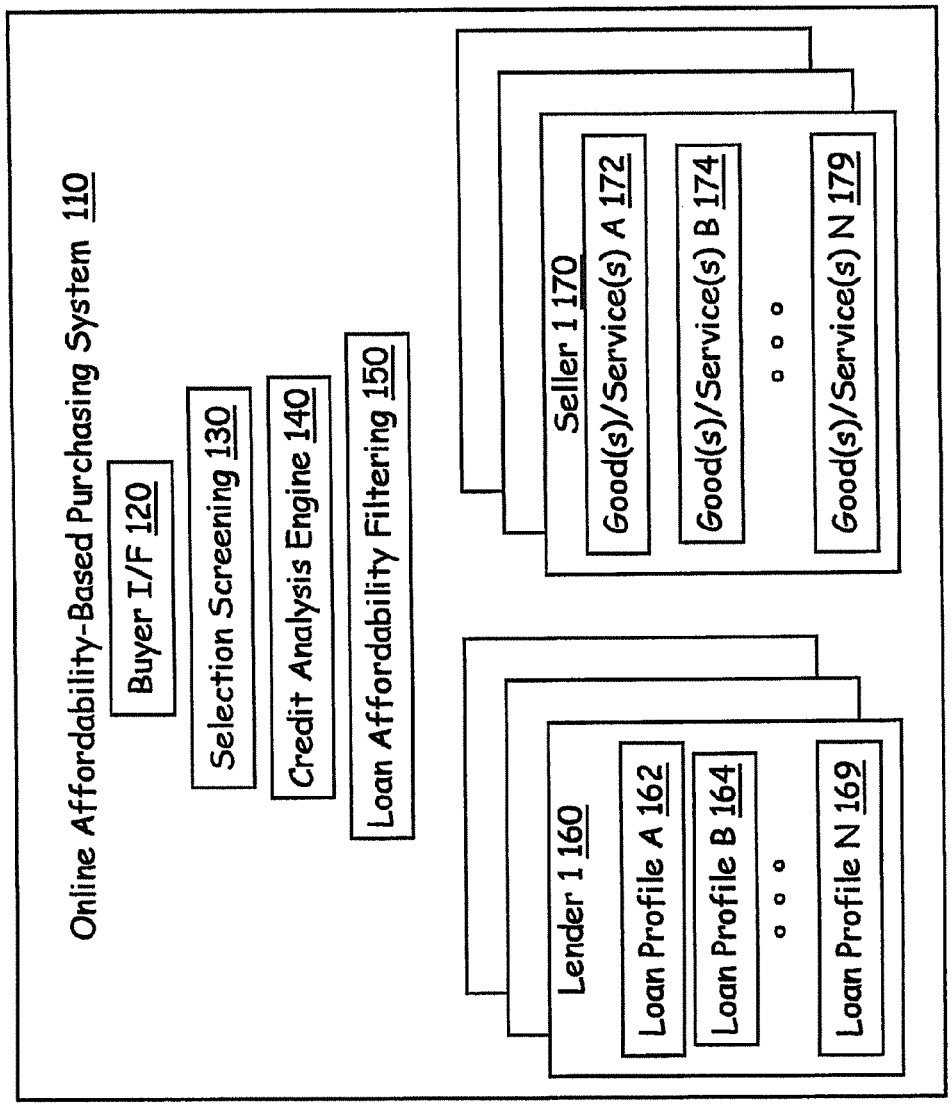
FIG. 1 is a system diagram illustrating an online, affordability-based purchasing system in accordance with the present invention.

FIG. 1 is a system diagram illustrating an online, affordability-based purchasing system 110 in accordance with the present invention. The online affordability-based purchasing system 110 enables a buyer to peruse a number of available good(s) and/or service(s) ("product(s)") to determine which of the products the buyer would like to purchase. Within the context of the detailed description of the invention contained herein, reference to a buyer also includes a potential buyer, as well as a buyer/potential buyer who is invoking the system to determine the availability of products for purchase or potential purchase. The online, affordability-based purchasing system 110 also enables a buyer to obtain financing for those products the buyer desires to purchase on credit. Within the context of the detailed description of the invention contained herein, reference to a loan, financing or credit also includes lease.

The online, affordability-based purchasing system 110 may include, among other components, a buyer interface (I/F) 120 that is operative to enable a buyer to interface with a lender 1 160 and a seller 1 170. The lender 1 160 contains a number of loan profiles illustrated by, for example, a loan profile A 162, a loan profile B 164, and a loan profile N 169. In addition, multiple lenders are included within the scope and spirit of the invention as illustrated in the FIG. 1, each containing a number of loan profiles in similar fashion to the lender 1 160. The buyer interface (I/F) 120 is operable to interface with each of these lenders as well.

Similarly, the seller 1 170 offers a number of good(s) and/or service(s) illustrated by, for example, a good(s) and/or service(s) A 172, a good(s) and/or service(s) B 174, and a good(s) and/or service(s) N 179. In addition, multiple sellers are included within the scope and spirit of the invention as illustrated in the FIG. 1, each containing a number of good(s) and/or service(s) in similar fashion to the seller 1 170. The buyer interface (I/F) 120 is operable to interface with each of these sellers as well.

The online, affordability-based purchasing system 110 includes, for example, a selection screening component 130, a credit analysis engine 140 and loan affordability filtering component 150. The selection screening component 130 enables a buyer to select desired products for analysis or purchase as well select desired loans. A buyer, via the buyer interface (IF) 120, provides buyer information to the credit analysis engine 140. The credit analysis engine 140 uses the buyer information, loan profile or parameter information of one or more lenders, and buyer credit information to determine the specific product(s) the buyer can afford to finance. The loan affordability filtering screening component 150 then indicates to the buyer those specific product(s) and the specific loan(s) that can be used to finance those product(s).

The loan profile or parameter information used by the credit analysis engine 140 may or may not require that the specific product(s) of interest and/or the seller(s) of those product(s) be considered in affordability calculations. For example, for loans that apply to all product(s) and seller(s), the credit analysis engine 140 simply calculates a maximum loan amount that the buyer can afford for each particular loan of each lender, without considering the specific product(s) of interest and/or the seller(s) of those product(s). The calculated maximum loan amount for each loan is then beat against the products of interest, and the specific product(s) that the buyer can afford to finance are identified or selected. The identified product(s), and the loan(s) applicable to each, are then displayed.

Some loan profiles may, however, require that the product(s) and/or the seller(s) be considered. In other words, a loan may only apply to a particular product, to a particular model of a product and/or to a particular seller. For example, in the case where the product of interest is an automobile or other vehicle, a lender may only offer a certain interest rate (e.g., 2.9%) for a specific manufacturer's model (e.g., Ford Explorer). Alternatively, a lender may only offer loans for specific manufacturer's products, because, for example, those products typically have a higher residual or resale value. Or a lender may only finance a certain type of product, such as an automobile or home, for example. In any case, the credit analysis engine 140 is "smart" in that it uses this type of limiting information in calculating affordability.

Specifically, the credit analysis engine 140 is operable to beat the various loan profiles, for example, the loan profile A 162, the loan profile B 164, up to the loan profile N 169 of FIG. 1, against the available good(s) and/or service(s), for example, the good(s) and/or service(s) A 172, the good(s) and/or service(s) B 174, up to the good(s) and/or service(s) N 179 of FIG. 1, to identify or select those good(s) and/or service(s) that a buyer is qualified to finance. Only those good(s) and/or service(s) that a buyer is qualified to finance are then displayed to the buyer. Alternatively, all of the good(s) and/or service(s) selected by the buyer are displayed, and those good(s) and/or service(s) for which the buyer does not qualify for financing are indicated as such upon display.

In any case, the buyer may select a product and an associated loan using the selection screening component 130 and close the deal. As discussed more completely below, the buyer may also use the selection screening component 130 prior to the credit analysis and affordability functionality to pre-select only a portion of all the available products. Only these pre-selected products are then used in the affordability analysis.

The online, affordability-based purchasing system 110 may also be used to provide credit advice to a buyer. For example, the online, affordability-based purchasing system 110 may be implemented to enable the buyer to better manage the buyer's own finances so that the buyer may maximize his/her affordability-based financing. In one instance, for example, the credit analysis engine 140 may identify that if a buyer changes certain financial variables, such as, for example, reducing his/her revolving debt by a certain amount, increasing the down payment being offered by a certain amount, and/or modifying the loan term, the buyer would then qualify to finance more expensive or a greater number of product(s), or qualify for a greater number of loans. The credit analysis engine 140 may then cause all or a portion of this information to be displayed to the buyer to enable the buyer to modify the buyer's personal financial variables, if desired.

Of course, it should be understood that the functionality of the credit analysis engine 140 and the affordability filtering component 150 may be incorporated into a single engine or component.

Figure 2:
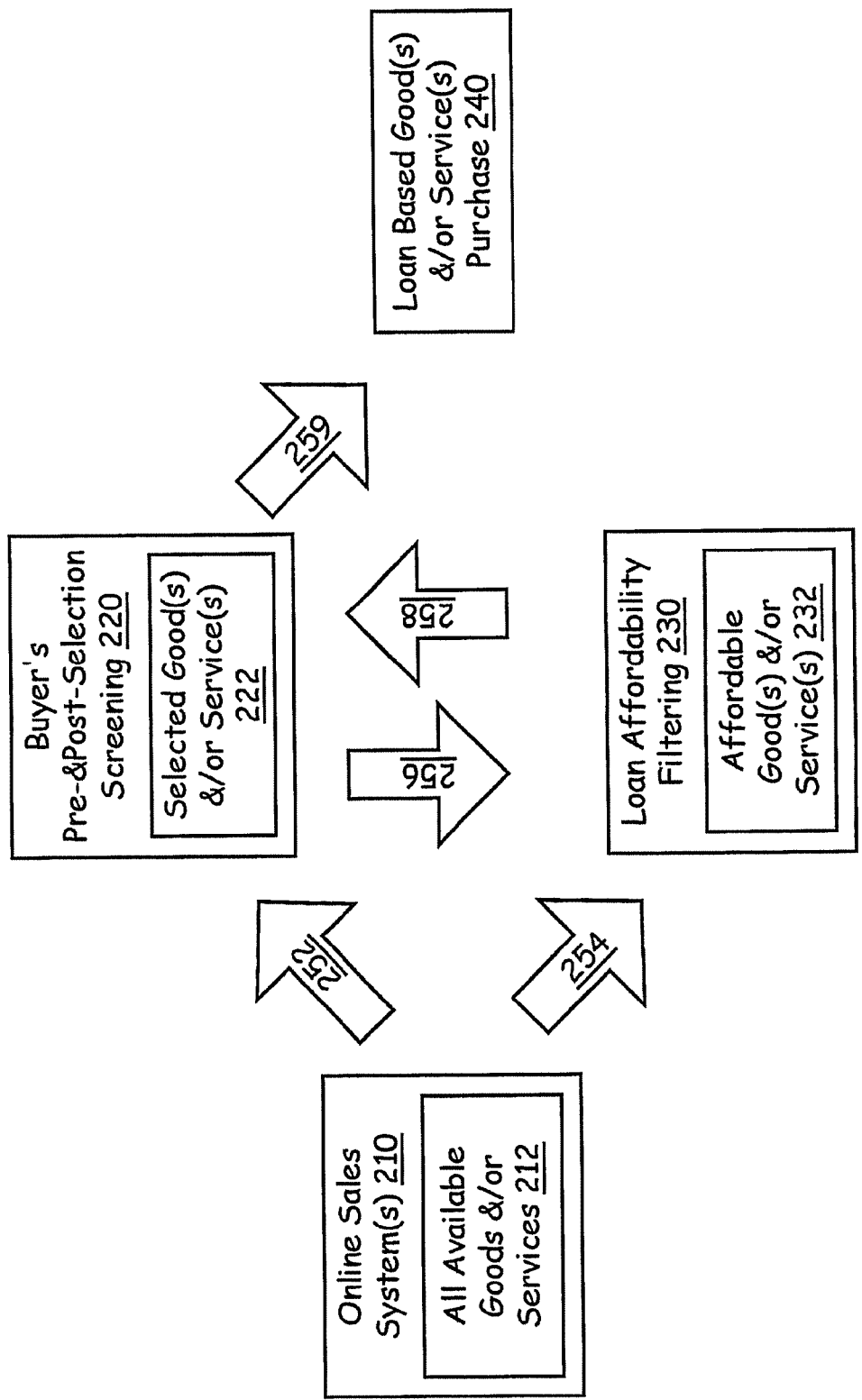
FIG. 2 is a flow diagram illustrating exemplary operational flow of the online, affordability-based purchasing system of FIG. 1.

FIG. 2 is a flow diagram illustrating exemplary operational flow of the online, affordability-based purchasing system of FIG. 1. The system is operable for a buyer to first enter an online sales system(s) 210. In choosing a path 254, the buyer elects loan affordability filtering 230 based on all available good(s) and/or service(s) 212 that are offered within the system. The loan affordability filtering 230 determines those affordable good(s) and/or service(s) 232 from all available good(s) and/or service(s) 212. The buyer is provided with only those good(s) and/or service(s) that the buyer can afford with or without financing. In other words, the system performs loan affordability filtering and displays only those good(s) and/or service(s) for which the buyer can qualify for financing, and/or good(s) and/or service(s) that the buyer may purchase outright without financing. Then, following a path 258, the buyer selects the desired goods and/or service(s) 222 using post-selection screening 220. Finally, following a path 259, the buyer purchases the selected, affordable good(s) and/or service(s), as indicated at loan based good(s) and/or service(s) purchase 240. The sequence via the paths 254, 258, and 259 represents one embodiment of the operational flow of the invention that provides for no pre-selection of good(s) and/or service(s).

Alternatively, the buyer enters the online sales system(s) 210 and, following a path 252, elects to perform pre-selection screening 220. The buyer pre-selects certain good(s) and/or service(s) from all available good(s) and/or service(s) 212 that are offered within the system. The buyer may then purchase the pre-selected goods via the loan based good(s) and/or service(s) purchase 240 if the buyer already has financing for the purchase. Alternatively, following a path 256, the buyer may elect loan affordability filtering 230, which selects and displays only those of the pre-selected good(s) and/or service(s) 222 that the buyer can afford to finance. The buyer may then select one of the affordable good(s) and/or service(s) 232, and purchase, following path 259, the selected good(s) and/or service(s).

As can be seen, the selection screening 220 may be performed by the buyer either before and/or after performing the loan affordability filtering 230. In addition, loan affordability filtering may be performed a number of times before a buyer selects goods for purchase. For example, after loan affordability is performed once, a buyer may use post-selection screening to select a subset of affordable products, and then may decide to modify certain financial variables, such as down payment or loan term, and then perform loan affordability filtering again to see which of the subset of affordable products the buyer can still afford. This process may be repeated as desired by the buyer.

As mentioned above, in one embodiment, loan affordability filtering permits display of only those good(s) and/or service(s) that the buyer is qualified to finance. In another embodiment, loan affordability filtering permits displays of all selected good(s) and/or service(s), but indicates to the buyer those that the buyer is not qualified to finance. For example, those good(s) and/or service(s) for which financing cannot be secured may be highlighted or printed in a pre-determined color, such as red, for example. Those good(s) and/or service(s) for which the buyer is qualified to finance may similarly be highlighted or printed in another pre-determined color, such as green, for example. In addition, a third category may also be used. Specifically, for example, "borderline" good(s) and/or service(s) may be highlighted or printed in a third pre-determined color, such as yellow, for example. A third category as such may represent those good(s) and/or service(s) that the buyer could potentially finance if the buyer were to change one or more loan parameters, such as, for example, increasing the buyer's down payment or reducing a certain amount of the buyer's pre-existing debt. In any case, any number of ways to indicate loan affordability filtering results are possible, and are included within the scope of the invention.

Figure 3:
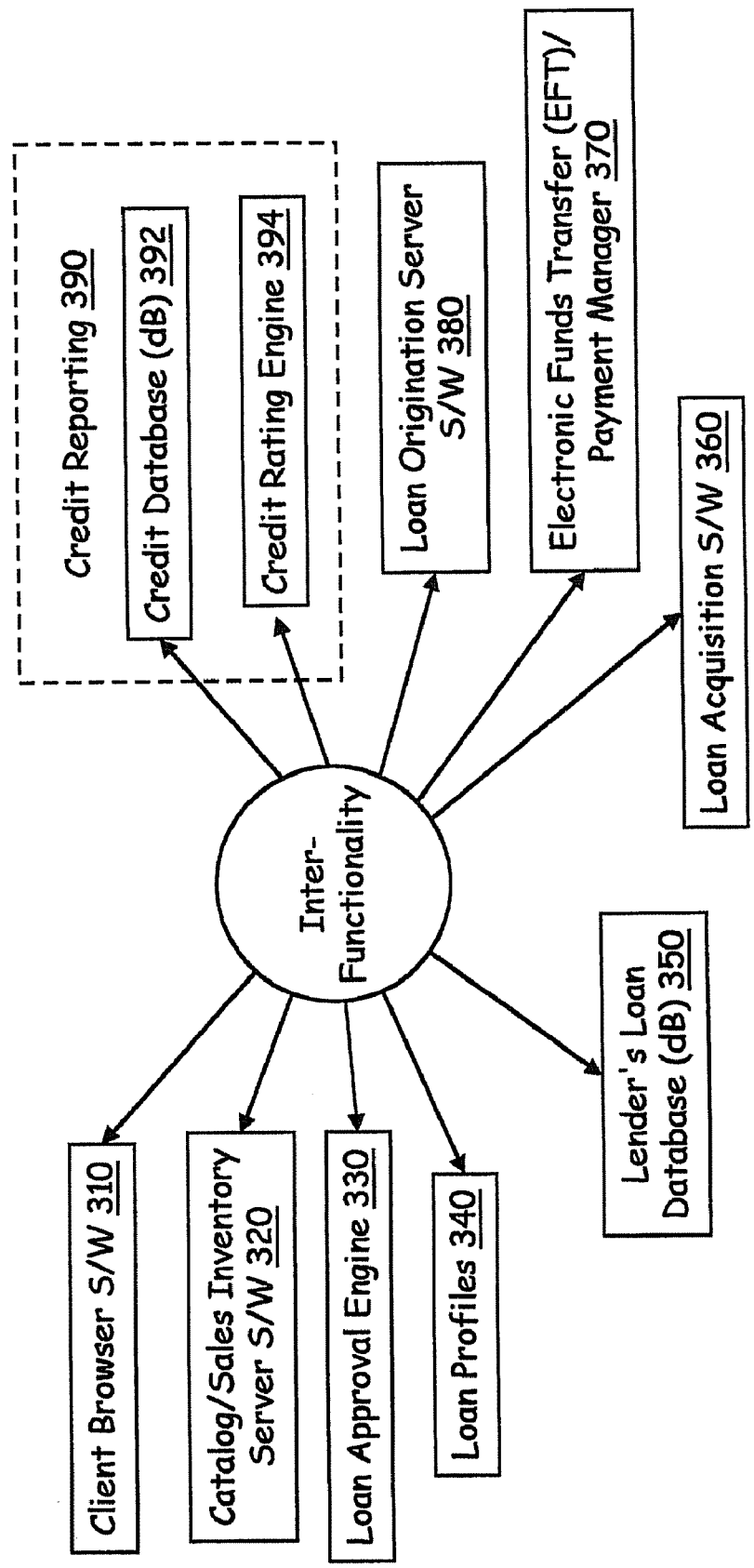
FIG. 3 is a functional diagram illustrating the interaction of various components of the online, affordability-based purchasing system of FIGS. 1 and 2.

FIG. 3 is a functional diagram illustrating the interaction of various components of the online, affordability-based purchasing system of FIGS. 1 and 2. The online, affordability-based purchasing system includes client browser software (S/W) 310 that is used by a client, such as a buyer, lender or seller, for example, to interact with the other components or the system. For example, using the client browser software (S/W) 310, a client may interact with catalog/sales inventory server software (S/W) 320 to access what good(s) and/or service(s) are available from any number of providers of good(s) and/or service(s) in accordance with any of the various embodiments of the invention. Similarly, a client may interact with loan acquisition software (S/W) 360 and loan origination server software (S/W) 380 to perform loan acquisition and loan origination, respectively.

The system also includes a loan approval engine 330 that determines whether the buyer qualifies for financing to assist in any purchase, and in the event the buyer does qualify for financing, determines the amount and degree of financing for which the buyer is qualified. To perform these determinations, the loan approval engine 330 uses, among other things, multiple loan profiles 340 and a lender's loan database (dB) 350. The loan approval engine 330 is operable to perform loan approval analysis for the buyer on a good and/or service basis.

In addition, the loan approval engine 330 is operable to perform loan approval analysis for a buyer on a category basis. More particularly, various categories of products typically have different qualifications standards. For example, different parameters are considered to qualify a buyer for a home purchase, as compared to those considered to qualify a buyer for an automobile purchase, as compared to those considered to qualify a buyer for a consumer product purchase, and so on. The loan approval engine 330 is capable of performing different analyses as a function of the specific purchase for which financing is being sought and on a category basis.

The multiple loan profiles 340 correspond to the different loan profiles provided by various lenders, some or all of which are contained within the lender's loan database (dB) 350. In one embodiment, the multiple loan profiles 340 and the loan approval engine 330 are co-located. In another embodiment, they are located in different locations.

As mentioned above, to originate a loan using traditional approaches, a loan approval officer or seller must execute a large amount of paperwork and verify certain buyer related parameters (such as, for example, the employment of a buyer who seeks the loan) before the loan can be approved for that buyer. The loan origination server software (S/W) 380 is operative, in conjunction with the loan approval engine 330, the multiple loan profiles 340, and the lender's loan database (dB) 350, to perform automated loan approval. The loan origination server software 380 performs all of the processing and paperwork that is required to perform loan approval, and may also include buyer signature capture functionality. The automated system enables loan origination without the assistance of a loan approval officer, and enables an employee having lower qualifications to assist a buyer in interfacing with the system to secure financing for a purchase. In fact, the loan origination server software (S/W) 380 is operable to perform automated loan origination without the necessity of any employee whatsoever. In other words, a buyer may perform loan origination on his/her own, subject, of course, to verification by the lender/seller of information provided by the buyer.

As mentioned above, lenders may use the loan acquisition software 360 to analyze and purchase desirable loans. The loan origination acquisition software (S/W) 360 is further operable to transfer loans that a lender sells to the purchasing institutions.

The system also includes an electronic funds transfer (EFT)/payment manager 370 that is operable to coordinate with the buyer to repay a loan that is originated within the system through EFT from a buyer's account at a financial institution.

If desired, the system also provides a credit reporting function 390 that uses a credit database (dB) 392 and a credit rating engine 394. These components are used in performing credit analysis, as described above. These components may also be implemented to perform anonymous credit reporting for the buyer. A buyer has the option of determining if he/she is qualified for a loan, and in the event the buyer is not qualified, the system does not issue a negative credit report (a rejection) against the buyer's credit record.

Figure 4:
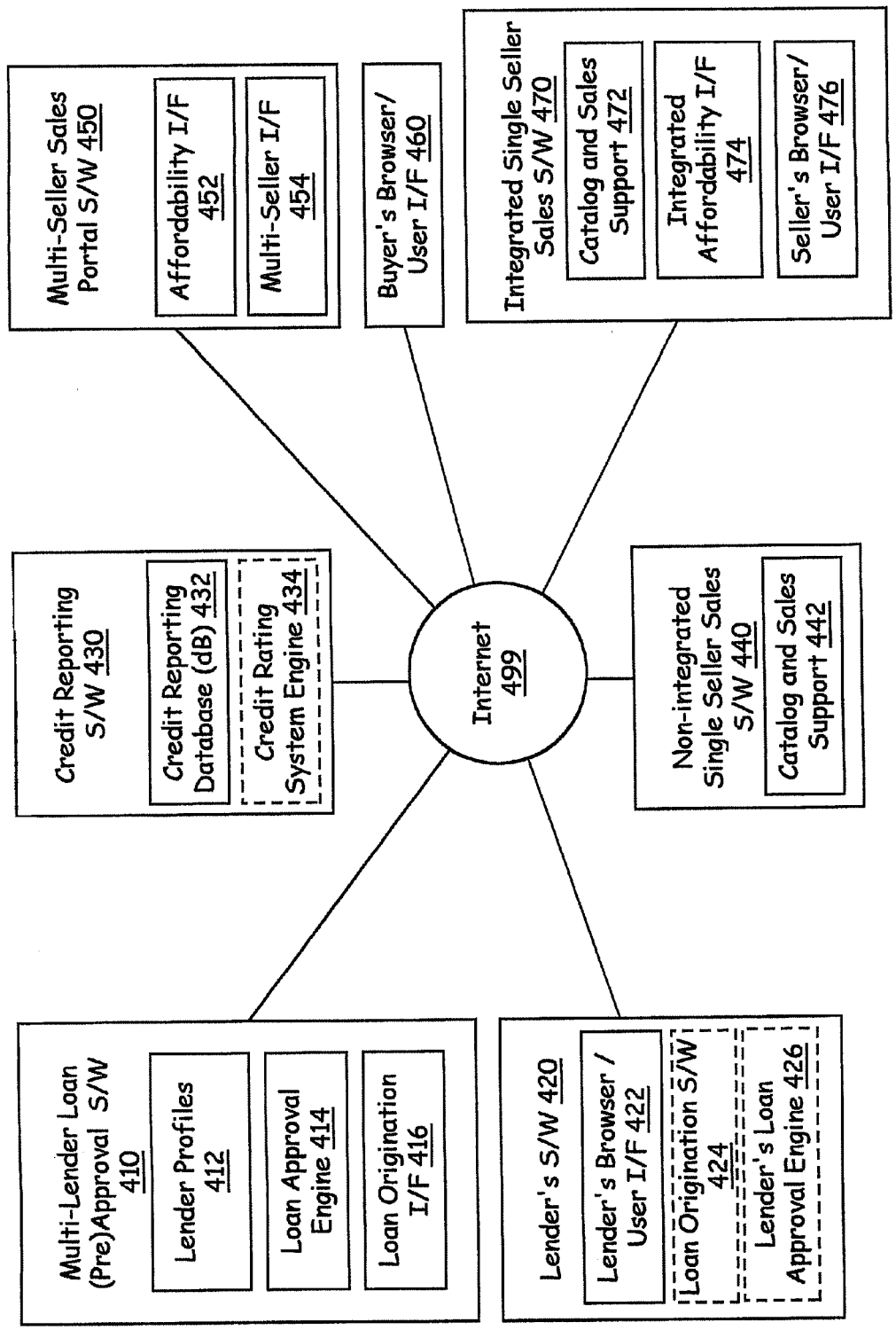
FIG. 4 is a system diagram illustrating another embodiment of the online, affordability-based purchasing system of FIG. 1.

FIG. 4 is a system diagram illustrating another embodiment of the online, affordability-based purchasing system of FIG. 1. Multi-lender loan (pre)approval software (S/W) 410, lender's software (S/W) 420, credit reporting software (S/W) 430, non-integrated single seller sales software (S/W) 440, multi-sales portal software (S/W) 450, and integrated single seller sales software (S/W) 470 all interconnect to the internet 499. A buyer can access all of the softwares (S/Ws) 410, 420, 430, 440, 450, and 470 using a buyer's browser/user interface (I/F) 460.

The multi-lender loan (pre)approval software (S/W) 410 itself may contain, among other components, multiple lender profiles 412, a loan approval engine 414, and a loan origination interface (I/F) 416. The multi-lender loan (pre)approval software (S/W) 410 is contained on a server connected to the Internet 499, in one embodiment of the invention. The multiple lender profiles 412 correspond to various loan providers who are integrated into the system. The loan approval engine 414 uses the multiple lender profiles 412 to perform pre-approval of a buyer's loan request for any of the multiple lenders who are integrated into the system. In one embodiment of the invention, the loan origination interface (I/F) 416 enables a buyer, lender or seller to pre-approve the buyer for loans of any lenders within the system.

The lender's software (S/W) 420 may contain, among other components, a lender's browser/user interface (I/F) 422, loan origination software (S/W) 424, and a lender's approval engine 426, in one embodiment of the invention. A lender's browser/user interface (I/F) 422 enables a lender to access, via the Internet 499, any of the other functionality within the system. If desired, the loan origination software (S/W) 424 and the lender's approval engine 426 may not be contained within the lender's software (S/W) 420. Parallel loan approval engines may also be included in various embodiments of the invention, as shown by the loan approval engine 414 and the lender's loan approval engine 426. If desired, the lender's software (S/W) 420 is operable to invoke the loan approval engine 414 via the Internet 499 when the lender's loan approval engine 426 is not contained within the lender's software (S/W) 420. Also, the loan origination interface (I/F) 416 and the loan origination software (S/W) 424 are operable in a parallel and cooperative manner as well, in that the loan origination interface (I/F) 416 may utilize the loan origination software (S/W) 424.

The credit reporting software (S/W) 430 may contain, among other components, a credit reporting database (dB) 432 and a credit rating system engine 434, in one embodiment of the invention. Alternatively, the credit rating system engine 434 may be located within other components in the system. For example, the functionality provided by the credit rating system engine 434 may be performed using one or both of the loan approval engine 414 and the lender's loan approval engine 426 when the credit rating system engine 434 is not included within the credit reporting software (S/W) 430.

The multi-seller sales portal 450 employs an affordability interface (I/F) 452 and a multi-seller interface (I/F) 454 to allow the buyer using the system to interact with other components within the system. The multi-seller sales portal 450 also allows any seller within the system to access other components within the system. For example, a seller within the system determines whether or not a buyer soliciting the seller qualifies for certain financing as provided by any lender participating within the system for any of the good(s) and/or service(s) offered by the seller.

The non-integrated single seller sales software (S/W) 440 may contain, among other things, a catalog and sales support function 442. The non-integrated single seller sales software (S/W) 440 is operable to perform framing on non-integrated single sellers as requested by a buyer using the system. For example, framing allows one web page to "frame" the contents of another web page. If desired, the non-integrated single seller sales software (S/W) 440 surrounds the framed web page with other information as desired by the various other functional blocks within the system. For example, a seller frames his own information such as the inventory of his own good(s) and/or service(s) using the non-integrated single seller sales software (S/W) 440. The framing performed in accordance with the present invention may be either dumb or intelligent. Intelligent framing extracts information from the non-integrated single seller sales web site and processes that information, while the dumb framing simply displays the information from the non-integrated single seller sales web site.

The integrated single seller sales software (SAY) 470 may contain, among other things, a catalog and sales support function 472, an integrated affordability interface (I/F) 474, and a seller's browser/user interface (I/F) 476. The catalog and sales support function 472 enables the integrated single seller to provide to a potential buyer access to all of the good(s) and/or service(s) within his inventory to a potential buyer. The integrated affordability interface (I/F) 474 allows a user of the system to perform affordability analysis for one or all of the integrated sellers coupled to the system. The seller's browser/user interface (I/F) 476 enables, like many of the other browser/user interfaces within the various embodiments of the invention, individual sellers or buyers can access via the internet all of the functionality provided by the various components within the system.

In the system of FIG. 4, a buyer may use the buyer's browser to access the multi-seller sales portal software 450. The buyer may then use the multi-seller interface 454 to view various products of multiple sellers, including integrated (i.e., participating) sellers, such as that represented by the integrated single seller sales software 470, and non-integrated (i.e., non-participating) sellers, such as that represented by the non-integrated single seller sales software 440. In the former case, the buyer is able to view products that are within the inventories of the sellers and are available for purchase. In the latter, the buyer is only able to view products that are listed on the sellers' website, which products may or may not be available for purchase, depending upon how up to date the sellers' websites are relative to their actual inventories.

In either case, the seller may then perform affordability analysis via the affordability interface 452 for all or a selected portion of the products, as mentioned above. In this situation, the multi-seller sales portal 450 may access, via the loan origination interface 416, the multi-lender loan (pre)approval software 410 to perform the analysis with multiple loans. The loan approval engine 414 uses the lender profiles 412, information provided by the buyer, and the credit reporting software 430 to determine the loans that are applicable for the selected product(s). Specifically, the loan approval engine 414 accesses the credit reporting software 430, which may be that of a third party credit agency, to obtain buyer credit information from the credit reporting database 432. Alternatively, the credit approval engine 414 simply obtains a credit rating for the buyer calculated by the credit rating system engine 434. In either case, the loan approval engine 414 uses the information obtained, as well as information provided by the buyer and the lender profiles 412, to determine whether the buyer qualifies to purchase the selected product for each of the multiple lenders' loans, as discussed above.

In another embodiment, the multi-lender loan (pre)approval software 410 accesses the systems of multiple lenders, which systems themselves perform the loan approval. For example, the lender's software 420 may perform such an analysis using the lender's loan approval engine 426, similarly as discussed above. In either case, the results of the analysis are communicated for display to the buyer.

Of course, the functionality of the multi-seller sales portal software 450 and that of the multi-lender loan (pre)approval software 410 may be incorporated into a single component within the system.

The multi-seller sales portal 450 may instead (or additionally), at the buyer's request, for example, access a single lender, such as that represented by the lender's software 420, to perform the analysis with the loan(s) of a single lender. In this situation, loan approval may be performed, similarly as discussed above, by the lender's system, such as that represented by the lender's software 420. The lender uses its current loan profiles, information provided by the buyer, and information obtained from the credit reporting software 430, as discussed above, to determine loan approval. Again, the information is communicated for display to the buyer.

At this point, the buyer may select a product and a loan, and complete the purchase via the buyer's browser/user interface 460. For example, if the buyer selects a loan via the multi-lender loan (pre)approval software 410, the loan origination interface 416 accesses loan origination software of the selected lender, such as the loan origination software 424. The loan origination software 424 provides to the buyer for completion via the buyer's browser/user interface 460, all the necessary financing forms, etc., and even provides for buyer signature capture. Thus, using the system of FIG. 4, a buyer can complete a financed purchase without the assistance of a seller or lender, subject to confirmation of the financial information provided by the buyer.

Alternatively, after the buyer performs affordability analysis on the buyer's browser/user interface 460, the buyer may suspend the transaction session, and proceed to a seller or sellers to view product(s) of interest. The system saves the buyer's profile information and affordability analysis results, so that the buyer may have a seller simply pull up the information on the seller's browser, such as the seller's browser/user interface 476, to view and discuss product(s) or loan(s) of interest, a specific product or loan pre-selected by the buyer via the buyer's browser/user interface 460, or even the products of another seller. The buyer may then, with the assistance of the seller via the seller's browser/user interface 476, select a product(s) for purchase and a loan(s) (or confirm previous selections) and complete the transaction. Again, the system provides for completion by the buyer and/or seller via the seller's browser/user interface 476 all the necessary financing forms, etc., eliminating the time-consuming paperwork that sellers must often undertake to complete a sale involving financing, particularly when sellers typically deal with multiple lenders and have different paperwork for each.

Instead of proceeding to a seller, the buyer may instead (or additionally) proceed to a lender or lenders to discuss financing options and continue the transaction session. The buyer may have a lender simply pull up the information on the lender's browser, such as the lender's browser user interface 422, to view and discuss loans or product(s) of interest, a specific loan or product pre-selected by the buyer via the buyer's browser/user interface 460, or even the loans of another lender. Similarly as above with respect to the seller, the buyer may, this time with the assistance of the lender via the lender's browser user interface 422, select a product(s) for purchase and a loan (or confirm previous selections) and complete the transaction. Once again, the system provides for completion by the buyer and/or lender via the lender's browser/user interface 422 all the necessary financing forms, etc.

A buyer may also start the whole process without ever using the buyer's browser/user interface 460. In other words, the buyer may proceed directly to a seller and/or lender to initiate a transaction session. In this case, the seller/lender may access the multi-seller sales portal software 450 and/or the multi-lender loan (pre)approval software 410 and assist the buyer in entering the buyer's financial information and perform affordability analysis via their respective browsers/user interfaces.

Figure 5:
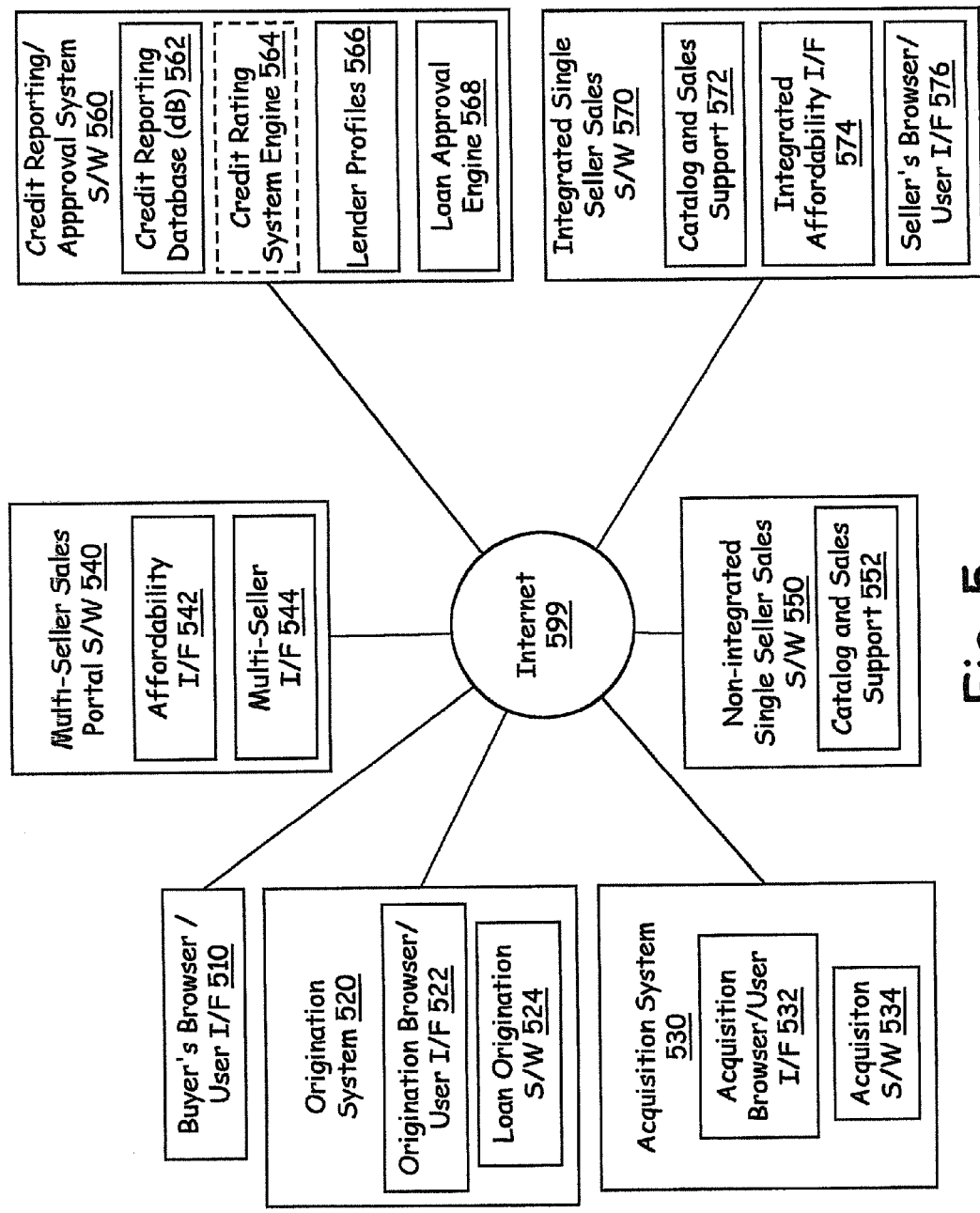
FIG. 5 is a system diagram illustrating a further embodiment of the online, affordability-based purchasing system of FIG. 1.

FIG. 5 is a system diagram illustrating a further embodiment of the online, affordability-based purchasing system of FIG. 1. An origination system 520, an acquisition system 530, a multi-seller sales portal software (S/W) 540, a non-integrated single seller sales software (S/W) 550, a credit reporting/approval system software (S/W) 560, and an integrated single seller sales software (S/W) 570 all interconnect to the internet 599. A buyer can access all of the functionality of FIG. 5 using a buyer's browser/user interface (I/F) 510.

The origination system 520 may contain, among other things, an origination browser/user interface (I/F) 522 and a loan origination software (S/W) 524. The acquisition system 530 may contain, among other things, an acquisition browser/user interface (I/F) 532 and an acquisition software (S/W) 534. The multi-seller sales portal software (S/W) 540 may contain, among other things, an affordability interface (I/F) 542 and a multi-seller interface (I/F) 544. The credit reporting/approval system software (S/W) 560 may contain, among other things, a credit reporting database (dB) 562, multiple lender profiles 566, a loan approval engine 568 and a credit rating system engine 564 in certain embodiments of the invention. The non-integrated single seller sales software (S/W) 550 performs, among other things, a catalog and sales support function 552. The integrated single seller sales software (S/W) 570 performs, among other things, a catalog and sales support function 572 and contains, among other things, an integrated affordability interface (I/F) 574 and a seller's browser 576. The functionality of the components in FIG. 5 may be similar to that discussed above with respect to earlier figures.

The origination system 520 operates with any number of existing lenders integrated into the system. For example, certain lenders target and seek certain risk profiles representative of a certain class of buyers. In addition, the origination system 520 eliminates the paperwork that is typically executed to perform loan processing. The origination system 520 may wait for verification of certain parameters provided by a buyer, such as verification of employment information. The acquisition system 530 is operable to purchase loans from the origination system 520. The credit reporting/approval system software (S/W) 560 may be a single software system or a distributed software system. In addition, the credit reporting/approval system software (S/W) 560 is operable to generate anonymous credit reports for various users of the system. The credit reporting/approval system software (S/W) 560 is also operable to determine the maximum value of a loan for which a buyer is approved. The multi-seller sales portal software (S/W) 540 is operable to use the maximum loan value for which a buyer is qualified and beat that maximum loan value against an inventory of good(s) and/or service(s) for a seller or a selected number of sellers to determine which of those good(s) and/or service(s) the buyer can afford to finance.

In addition, a selected number of good(s) and/or service(s) are provided to the system, and the credit reporting/approval system software (S/W) 560 is operable to perform different credit analysis as a function of the item for which the loan is being sought. For example, depending on whether the loan is being sought to purchase an automobile, a home, or to repay revolving credit, the credit reporting/approval system software (S/W) 560 is operable to accommodate the different manner in which parameters corresponding to the buyer are handled.

The non-integrated single seller sales software (S/W) 550 is operable to perform framing on non-integrated single sellers as requested by a buyer using the system. For example, framing allows one web page to "frame" the contents of another web page. If desired, the non-integrated single seller sales software (S/W) 550 surrounds the framed web page with other information, as desired, by the various other functional blocks within the system. For example, a seller frames his own information, such as the inventory of his own good(s) and/or service(s), using the non-integrated single seller sales software (S/W) 550. The framing performed in accordance with the present invention may be either dumb or intelligent. Intelligent framing extracts information from the non-integrated single seller sales web site and processes that provided information, while the dumb framing simply displays the information from the non-integrated single seller sales web site.

In the system of FIG. 5, a buyer may use the buyer's browser to access the multi-seller sales portal software 540. The buyer may then use the multi-seller interface 544 to view various products of multiple sellers, including integrated (i.e., participating) sellers, such as that represented by the integrated single seller sales software 570, and non-integrated (i.e., non-participating) sellers, such as that represented by the non-integrated single seller sales software 550. In the former case, as mentioned above with respect to FIG. 4, the buyer is able to view products that are within the inventories of the sellers and are available for purchase. In the latter, the buyer is only able to view products that are listed on the sellers website, which products may or may not be available for purchase, depending upon how up to date the sellers' websites are relative to their actual inventories.

In either case, the seller may then perform affordability analysis via the affordability interface 542 for all or a selected portion of the products, as mentioned above. In this situation, the multi-seller sales portal software 540 may access, via the affordability interface 542, the credit reporting/approval system software 560 to perform the analysis with multiple loans. The loan approval engine 568 uses the lender profiles 566, information provided by the buyer, and the credit reporting database 562 to determine the loans that are applicable for the selected product(s). Specifically, the loan approval engine 568 accesses the credit reporting database 562, to obtain buyer credit information. Alternatively, the loan approval engine 568 simply obtains a credit rating for the buyer calculated by the credit rating system engine 564, which may be part of the credit reporting approval system software 560 or part of the system of a third-party credit agency. In either case, the loan approval engine 568 uses the information obtained, as well as information provided by the buyer and the lender profiles 566, to determine whether the buyer qualifies to purchase the selected product for each of the multiple lenders' loans, as discussed above. The results of the analysis, i.e., the product(s) that the buyer can finance and the loans applicable to each, are communicated to the buyer for display.

At this point, the buyer may select a product and a loan, and complete the purchase via the buyer's browser/user interface 510. If the buyer selects a loan, the buyer may access loan origination software of the selected lender. Specifically, for example, the buyer may access, via the origination browser/user interface 522, the loan origination software 524 in the origination system 520. The loan origination software 524 provides to the buyer for completion via the buyer's browser/user interface 510, all the necessary financing forms, etc., and provides for buyer signature capture, similarly as discussed above.

The origination system 520 may be that of a single lender or part of a separate system that services multiple lenders. In addition, the functionality of the origination system 520, the multi-seller sales portal 540, and the credit reporting/approval system software 560 may be combined into one or two components within the system.

After the buyer performs affordability analysis via the buyer's browser/user interface 510, the buyer may suspend the transaction session, and proceed to a seller or sellers to view product(s) of interest. The system saves the buyer's profile information and affordability analysis results, so that the buyer may have a seller simply pull up the information on the seller's browser, such as the seller's browser/user interface 576, to view and discuss product(s) or loan(s) of interest, a specific product or loan pre-selected by the buyer via the buyer's browser/user interface 510, or even the products of another seller. The buyer may then, with the assistance of the seller via the seller's browser/user interface 576, select a product(s) for purchase and a loan(s) (or confirm previous selections) and complete the transaction. Again, the system provides for completion by the buyer and/or seller via the seller's browser/user interface 576 all the necessary financing forms, etc.

Also, as mentioned above, the buyer may initiate a transaction session by proceeding directly to a seller and/or lender to initiate a transaction session. For example, the seller/lender may, via their respective browsers/user interfaces, access the multi-seller sales portal software 540 and assist the buyer in entering the buyer's financial information and perform affordability analysis. Alternatively, the seller/lender may be integrated into the overall system, and be able to perform affordability analysis via their own systems, rather than through the multi-seller sales portal 540. Specifically, for example, the buyer may proceed to an integrated seller, such as that represented by the integrated single seller sales software 570, and perform affordability analysis using the seller's browser/user interface 576. In this situation, the seller, using the seller's browser/user interface 574 and via the seller's integrated affordability interface 574, accesses the credit reporting/approval system software 560, which performs the affordability analysis as discussed above.

Figure 6:
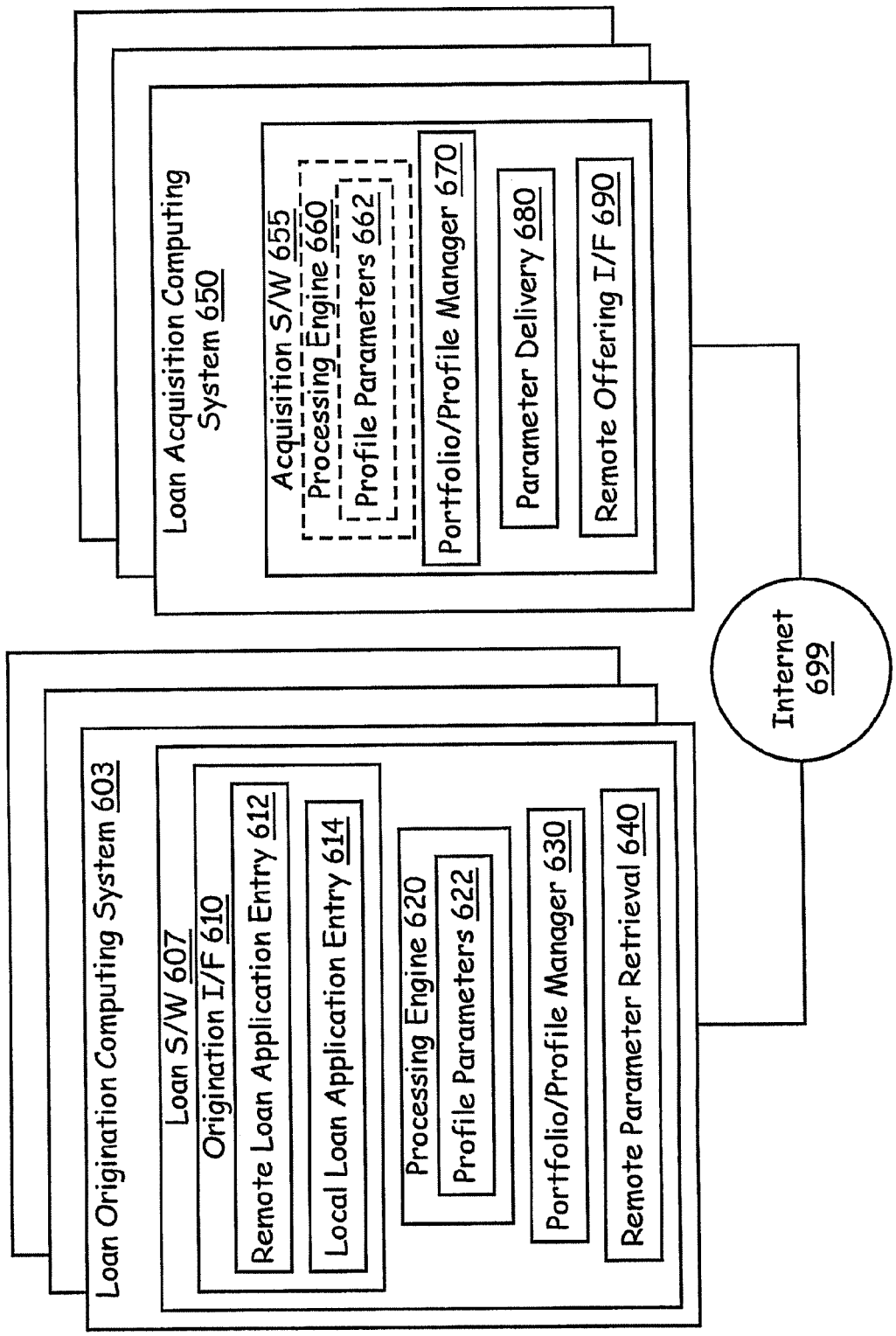
FIG. 6 is a system diagram illustrating an embodiment of a loan origination and acquisition system in accordance with the present invention, which may be a stand alone system or incorporated into the online, affordability-based purchasing system of the present invention.

FIG. 6 is a system diagram illustrating an embodiment of a loan origination and acquisition system in accordance with the present invention, which may be incorporated into the online, affordability-based purchasing system of the present invention, such as shown in FIG. 5 above, or may be a stand alone system. A loan origination computing system 603 and a loan acquisition computing system 650 both interconnect to the Internet 699. The loan origination system 603, as well as the loan acquisition computing system 650, may be part of a lender's system, part of a separate system accessed by the lender (or buyer or seller) via the lender's browser/user interface, or may each be a part of separate systems of different lenders.

The loan origination computing system 603 itself may contain, among other things, a loan software (S/W) 607. The loan software (S/W) 607 itself may contain, among other things, an origination interface (I/F) 610, a processing engine 620 having access to multiple profile parameters 622, a portfolio/profile manager 630, and a remote parameter retrieval function 640. The origination interface (I/F) 610 itself may contain, among other things, a remote loan application entry function 612 and a local loan application entry function 614.

The loan acquisition computing system 650 itself may contain, among other things, an acquisition software (S/W) 655. The acquisition software (S/W) 655 contains at least a portfolio/profile manager 670, a parameter delivery function 680, and a remote offering interface (I/F) 690. If desired, the acquisition software (S/W) 655 contains a processing engine 660 that gar employs multiple profile parameters 662. The processing engine 660 employing the multiple profile parameters 662 may be a parallel engine to the processing engine 620 employing the multiple profile parameters 622.

The system of FIG. 6 provides for evaluation of the risk of issuing a loan to a buyer after considering all of the parameters represented by the profile parameters 662, in such a way as to provide significant improvement over conventional methods that employ human employees who attempt to perform real time evaluation. The computer implementation of the invention does not limit the number of parameters that may be included in the risk evaluation that is performed for a specific buyer.

As mentioned above, the loan origination computing system 603 includes loan software 607 for analyzing risk and originating loans. The loan origination interface 610 enables remote loan application entry 612 via the browser/interface of other systems, and local loan application entry 614, if, for example, the loan origination computing system 603 is incorporated into a lender's system. The processing engine 620 uses the information provided via the origination interface 610 and the profile parameters 622 to evaluate whether the buyer should be approved for a loan, similarly as discussed above.

In addition, the processing engine 620 may likewise retrieve remote parameters via remote parameter retrieval 640 that are delivered by the loan acquisition computing system 650 via parameter delivery 680. The processing engine 620 may then use this information to determine whether or not to approve the buyer. In some cases as such, origination may depend, at least partially, on whether or not the loan fits within parameters of loans previously purchased by the lender or some other entity, or those that the lender or other entity has been successful in selling in the past. This information may be generated/maintained by the portfolio/profile manager 670.

The loan software 607 may also include a portfolio/profile manager 630. The manager 630 keeps track of the portfolio of loans, and their respective profiles and buyer information, being carried by the lender, which information may also be considered in evaluating the relative risks of issuing a loan to a particular buyer. If, for example, the buyer's financial condition and loan requested matches those of others within the lender's portfolio that are deemed desirable (e.g., low risk) by the lender, the lender may consider this information in determining approval or the amount the lender is willing to finance.

The information may also be used to determine whether or not a lender should sell any loan being carried by the lender. If the lender approves a buyer for a loan, or previously acquired that loan, the portfolio/profile manager 630 may evaluate that buyer/loan relative to others within the lender's portfolio to evaluate the relative risks of continuing to carry that loan. If the manager 630 determines that the risk is too high, it may designate the loan as one that should be sold by the lender. The manager 630 may also evaluate loans within the lender's portfolio, and use loan history to modify the profile parameters used by the lender, as necessary, in order to lower risk or increase origination while maintaining low risk.

The loan acquisition computing system 650 includes acquisition software 655 that may be used by a lender (or other entity) to acquire loans deemed desirable and to sell loans deemed undesirable. The acquisition software 655 includes a portfolio/profile manager 670 that keeps track of the portfolio of loans, and their respective profiles and buyer information, being carried by the lender, which information may be considered in evaluating the relative risks of acquiring certain loans and desirability of selling certain loans.

The acquisition software 655 also includes a remote offering interface 690 for sending or receiving loan acquisition offers. For example, the acquisition software 650 may receive, in response to a request or otherwise, an offer to sell a particular loan. The acquisition software 655 may include a processing engine 660 that uses profile parameters 622, and, if desired, information generated/maintained by the portfolio/profile manager 670 to analyze relative risks and determine whether the offered loan is approved for acquisition. Alternatively, the acquisition software 655 uses information generated by a remote processing engine, such as processing engine 620, and/or information generated/maintained by the portfolio/profile manager 670, to analyze relative risks and determine whether the offered loan is approved for acquisition.

The loan acquisition software 655 may also communicate, via the remote offering interface 690, a request to acquire certain loans. The acquisition software 655 delivers the required parameters via parameter delivery 680 to, for example, the loan origination computing system 603, which retrieves the parameters via remote parameter retrieval 640 and uses the parameters retrieved to determine whether or not any of the loans in the profile meet those parameters. If at least one does, and the loan origination computing system 603 desires to sell the identified loan(s), the loan acquisition computing system 650 completes the transaction with the loan origination computing system 603, assuming the terms of sale are otherwise acceptable.

In addition, the system of FIG. 6 enables a user (e.g., a buyer, lender or seller) to define an interest rate, decide whether to increase or decrease a down payment, or to increase or decrease the number of months of the term of the loan, among other parameters, dealing with the approval of the loan for a buyer. This allows for intelligent advising, where suggestions are made to the buyer to assist the buyer in determining what loan parameters should be changed so that the buyer can qualify for a loan having a larger maximum ceiling. For example, in certain cases, the re-payment of a predetermined amount of a buyer's existing revolving debt will significantly increase the maximum loan for which the buyer will qualify.

Figure 7:
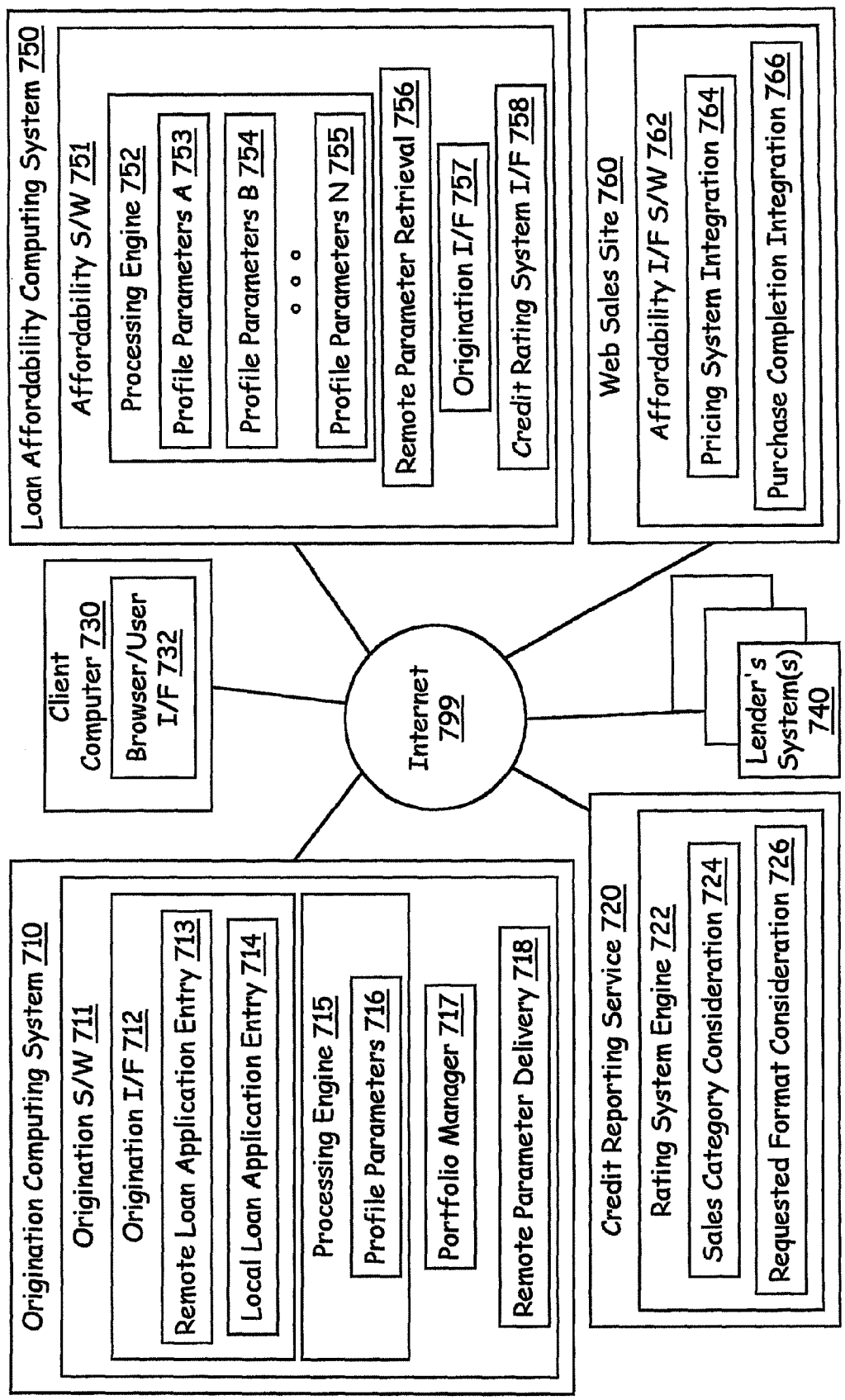
FIG. 7 is a system diagram illustrating yet another embodiment of the online affordability-based purchasing system of FIG. 1.

FIG. 7 is a system diagram illustrating yet another embodiment of the online affordability-based purchasing system of FIG. 1. An origination computing system 710, a credit reporting service 720, a single or multiple lender's system(s) 740, a loan affordability computing system 750, and a the web sales site 760 all interconnect to the internet 799. A client using the system can access all of the components of the system using a browser/user interface (I/F) 732, which may be contained within, for example, a client computer 730.

The origination computing system 710 may contain, among other things, an origination software (S/W) 711. The origination software (S/W) 711 may contain, among other things, an origination interface (I/F) 712, a processing engine 715, a portfolio manager 717, and a remote parameter delivery function 718. The origination interface (I/F) 712 itself may perform, among other functions, a remote loan application entry function 713 and a local loan application entry function 714. The processing engine 715 itself may contain, among other things, multiple profile parameters 716. The credit reporting service 720 itself may contain, among other things, a rating system engine 722. The rating system engine 722 itself may perform, among other functions, a sales category consideration function 724 and a requested format consideration function 726. The origination computing system 710 may have the same or similar functionality as the loan origination computing system 603 of FIG. 6.

The loan affordability computing system 750 itself may contain, among other things, an affordability software (S/W) 751. The affordability software (S/W) 751 itself may contain, among other things, a processing engine 752, an origination interface (I/F) 757, and a credit rating system interface (I/F) 758. The affordability software (S/W) 751 itself may perform, among other functions, a remote parameter retrieval function 756. The processing engine 752 itself may contain, among other things, multiple profile parameters A 753, multiple profile parameters B 754, and multiple profile parameters N 755. The web sales site 760 itself may contain, among other things, an affordability interface (I/F) software (S/W) 762. The affordability interface (I/F) software (S/W) 762 itself may perform, among other things, a pricing system integration function 764 and a purchase completion integration function 766.

The interconnection between the credit reporting service 720 and the Internet 799 may be a low bandwidth connection in certain embodiments of the invention. The credit reporting service 720 may generate a specific type of report or rating, using the sales category consideration 724 component of the credit rating engine 722, pertaining to the type of good(s) and/or service(s) for which financing is sought. For example, the credit reporting service 720 can handle different types of good(s) and/or service(s) in different manners to ensure that the maximum loan value for those specific good(s) and/or service(s) is found. When dealing with different good(s) and/or service(s), such as an automobile or a home, or with repayment of revolving credit, the credit reporting/service 720 is operable to accommodate the different manner in which parameters corresponding to the buyer are entered.

In addition, the credit reporting service 720 may provide for anonymity in the loan approval process. When a buyer uses conventional methods employed in purchasing good(s) and/or service(s), such as automobiles, whenever a loan analysis is performed wherein the buyer is denied financing, the buyer receives an undesirable rejection on his personal credit history. If a buyer goes from one provider of good(s) and/or service(s) to another and the buyer is continually rejected for financing, the buyer's personal credit history can be significantly compromised. In response to the requested format consideration 726 component, the credit reporting service 720 may provide to the buyer multiple, anonymous credit reports, if so requested by the buyer. In addition, a full credit report is sent to a seller's system, as shown in the various embodiments of the system, but only after the buyer's loan has been approved.

In addition the credit reporting service 720 may, in response to the requested format consideration 726 component, generate only a credit rating and nothing else, if requested by the client. For example, the credit reporting service 720 does not generate a large file having all of the buyer's account information listed. Rather, the credit reporting service 720 generates only a single value indicative of the buyer's credit rating. This reduction of information provides for a significant savings of bandwidth within the system.

In the system of FIG. 7, a client, such as a buyer, for example, uses the browser/user interface 732 of client computer 730 to access a web sales site 760 of a single seller or one that interfaces with multiple sellers. The buyer can view products and then select a product or products to perform an affordability analysis. The buyer may, for example, select a button or icon on the web sales site 760, which vectors the buyer to the loan affordability computing system 750. The buyer then uses the affordability software 751 and information provided via the affordability interface software 762 to perform affordability analysis, as discussed above.

For example, the processing engine 752 may access the credit reporting service 720, via the credit rating system interface 758, to obtain a buyer credit rating. The processing engine 752 then uses the credit rating obtained, pricing information from pricing system integration 764 component, and the profile parameters of multiple lenders stored in memory, for example, to determine the product(s) that the buyer qualifies to purchase and the loans) applicable to each. The processing engine 752 may also retrieve, via the remote parameter retrieval 756 component, remote parameters of other lenders, which parameters may be located in the origination computing system 710 or the lender's system(s) 740, to consider the loans of those lenders in the analysis. The remote parameter retrieval 756 component may also be used to obtain updated parameter information from multiple lenders so that the loan affordability computing system 750 may update the multiple profile parameters used by the processing engine 752. In either case, the remote parameter retrieval 756 component may interface with a remote parameter delivery component, such as remote parameter delivery 718 component of origination computing system 710 or that of the lender's system(s) 740.

Once the buyer performs the affordability analysis, the buyer may select a product and a loan, and complete the purchase. The affordability software 751 may access the origination computing system 710 via the origination interface 757, and the origination computing system 710 may originate the loan, similarly as discussed above. The web sales site 760 includes purchase completion integration 766 so that the buyer can purchase the selected product from the web sales site 760, using the loan originated via the loan affordability computing system 750.

Figure 8:
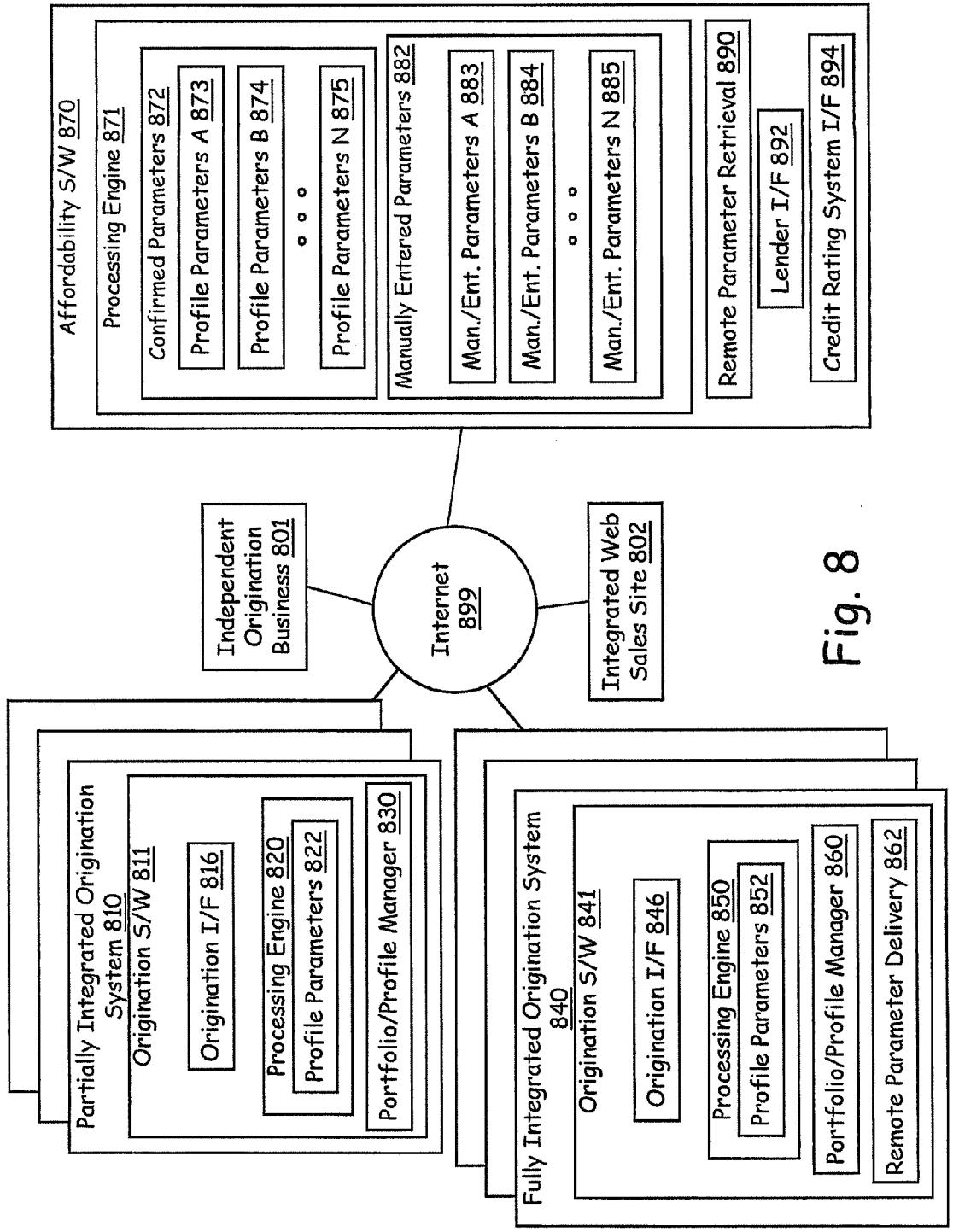
FIG. 8 is a system diagram illustrating a still further embodiment of the online, affordability-based purchasing system of FIG. 1.

FIG. 8 is a system diagram illustrating a still further embodiment of the online, affordability-based purchasing system of FIG. 1. The system of FIG. 8 illustrates one embodiment of the invention wherein certain lenders need not necessarily directly participate with the system, yet their information is nevertheless provided to a user. A partially integrated origination system 810, an independent origination business 801, a fully integrated origination system 840, an integrated web sales site 802, and an affordability software (S/W) 870 all interconnect to the Internet 899.

The partially integrated origination system 810 itself may contain, among other things, an origination software (S/W) 811. The origination software (S/W) 811 itself may contain, among other things, an origination interface (I/F) 816, a processing engine 820, and a portfolio/profile manager 830. The processing engine 820 itself may contain, among other things, multiple profile parameters 822.

The fully integrated origination system 840 itself may contain, among other things, an origination software (S/W) 841. The origination software (S/W) 841 itself may contain, among other things, an origination interface (I/F) 846, a processing engine 850 having multiple profile parameters 852, a portfolio/profile manager 860, and a remote parameter delivery function 862. The affordability software (S/W) 870 itself may contain, among other things, a processing engine 871, a lender interface (I/F) 892, that may perform, among other things, a remote parameter retrieval function 890, and a credit rating system interface (I/F) 894.

The processing engine 871 utilizes confirmed parameters 872 and manually entered parameters 882. The confirmed parameters 872 contains multiple profiles, as illustrated by multiple profile parameters A 873, multiple profile parameters B 874, and multiple profile parameters N 875, corresponding to different lenders integrated into the system, such as, for example, that represented by fully integrated origination system 840. The parameters of integrated systems as such may be delivered remotely, via a remote parameter delivery function, such as remote parameter delivery 862 function of system 840. The affordability software 870 uses the parameters delivered to update the confirmed parameters 872. The affordability software 870 may also retrieve such parameters, via the remote parameter retrieval 890 function, and similarly update the confirmed parameters 872. Since the confirmed parameters are those of integrated lenders, they do not need separate confirmation before loan origination.

The manually entered parameters 882, illustrated by manually entered parameters A 883, manually entered parameters B 884, and manually entered parameters N 885, are those of non-integrated lenders, which parameters are manually entered. Parameters as such should be confirmed with the relevant lender before loan origination to determine whether they are still valid.

The independent origination business 801 is illustrative of one business, which may also be a provider of good(s) and/or service(s), that is not directly integrated nor participating in the system. The parameters for such an independent origination business may be added manually to the system. The integrated web sales site 802 is illustrative of a business that is fully integrated, or participating, in the system. A client may therefore access the affordability software 870 via the integrated web sales site 802.

The multiple profile parameters 822 within the processing engine 820 are pulled, not pushed. However, the multiple profile parameters 852 within the processing engine 850 are pushed within the system. The effects of any changes of the multiple profile parameters 852 within the processing engine 850 take effect immediately due to the full integration of the fully integrated origination system 840. The confirmed parameters 872 within the affordability software (S/W) 870 are confirmed to be exactly those parameters corresponding to various lenders. The manually entered parameters 882 within the affordability software (S/W) 870 are entered manually after verifying, if desired, that the parameters are actually indicative and representative of the parameters provided by the various lenders cooperating with the system. Also, the processing engine 871 within the affordability software (S/W) 870 performs actual affordability analysis, and it is operable to perform estimated affordability analysis wherein a full credit report is not generated if not all of the parameters are available.

Figure 9:
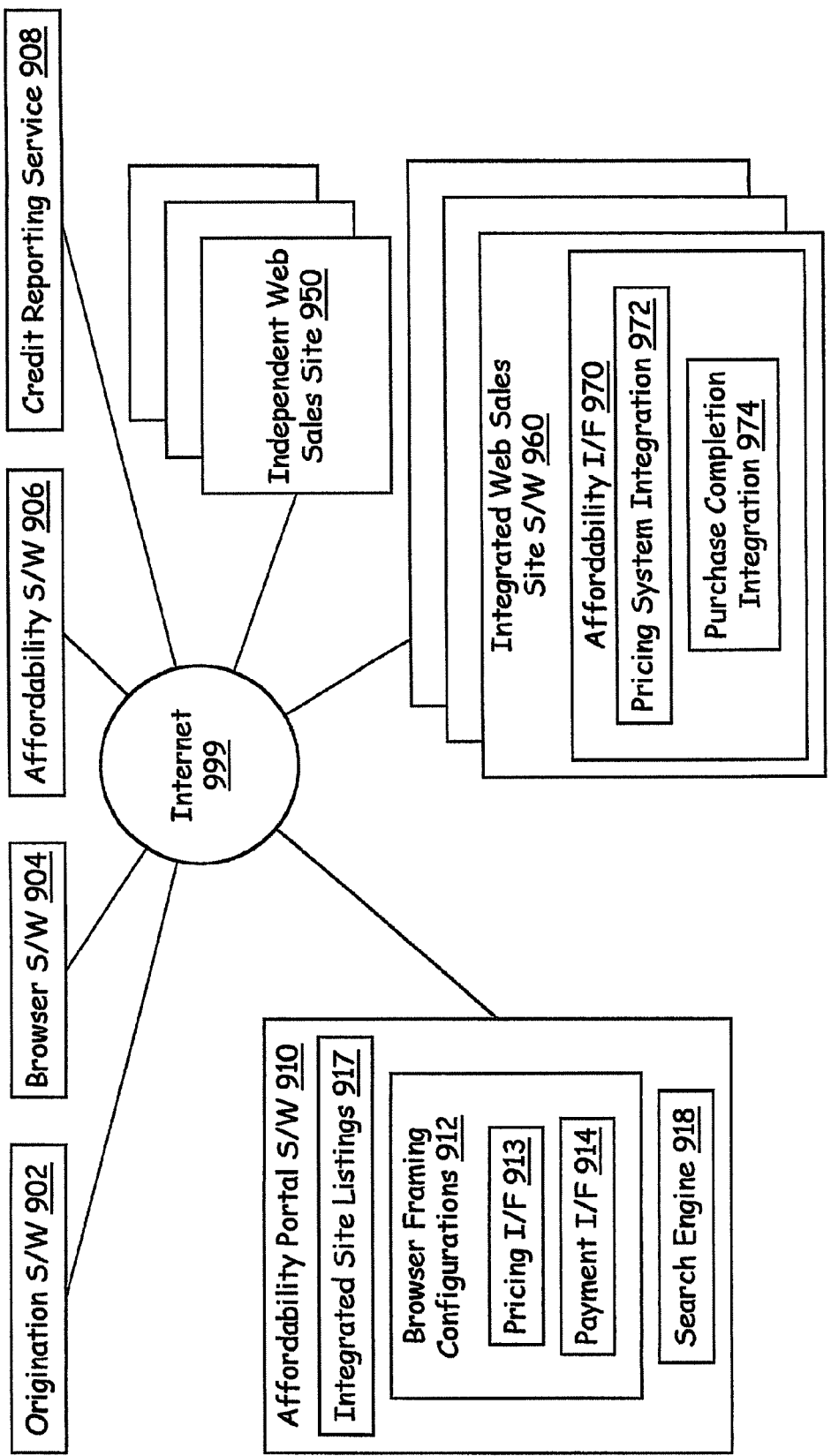
FIG. 9 is a system diagram illustrating another embodiment of the online, affordability-based purchasing system of FIG. 1 that utilizes an affordability portal.

FIG. 9 is a system diagram illustrating another embodiment of the online, affordability-based purchasing system of FIG. 1 that utilizes an affordability portal. An origination software (S/W) 902, a browser software (S/W) 904, an affordability software (S/W) 906, a credit reporting service 908, a number of independent web sales sites 950, an affordability portal software (S/W) 910, and a number of integrated web sales site softwares (S/Ws) 960 all interconnect to the Internet 999.

The affordability portal software (S/W) 910 itself may contain, among other things, a number of integrated site listings 917, a search engine 918, and a number of browser framing configurations 912 each having a pricing interface (I/F) 913 and a payment interface (I/F) 914. The integrated web sales site software (S/W) 960 itself may contain, among other things, an affordability interface (I1F) 970. The affordability interface (I/F) 970 may have, among other things, pricing system integration 972 and a purchase completion integration 974.

The affordability portal software (S/W) 910 is operable to serve as a front end for a number of different sellers. The affordability portal software (S/W) 910 serves to provide a buyer using the system, access to a number of different sellers providing various good(s) and/or service(s). The affordability portal software (S/W) 910 also is operable to perform framing for any of the various independent web sales sites 950. Again, the framing performed here may be intelligent or dumb. For example, the framing may extract information from certain of the various independent web sales sites 950, or may simply display the information provided from certain of the various independent web sales sites 950. The extracted information in the intelligent framing embodiments of the invention is used by the affordability software (S/W) 906 to perform analysis for loan approval and loan acquisition by a buyer using the system.

The origination software 902 affordability software 906 and the credit reporting service 908 may have the same functionality of similar components discussed above.

In the system of FIG. 9, a buyer may, via the buyer's browser software 904 access the affordability portal software 910, which contains integrated site listings 917. The buyer may access the integrated sites listed, or perform a search of all sites, integrated or independent, using the search engine 918.

When a buyer accesses an integrated site, such as that represented by the integrated web sales site software 960, the buyer may perform an affordability analysis using the affordability software 906. The affordability interface 970 enables pricing information to be accessed by the affordability software 906, and enables the purchase to be completed, via the affordability portal 910, if desired, using a loan originated via the origination software 902.

When a buyer desires to purchase a product from an independent web sales site 950, the affordability software 910 frames pricing and payment information, via the pricing interface 913 and payment interface 914, respectively. The pricing information obtained may be used to perform an affordability analysis using the affordability software 906. The payment interface 914 may be used to complete a purchase of a product from the independent web sales site 950 via the affordability portal software 910.

Figure 10:
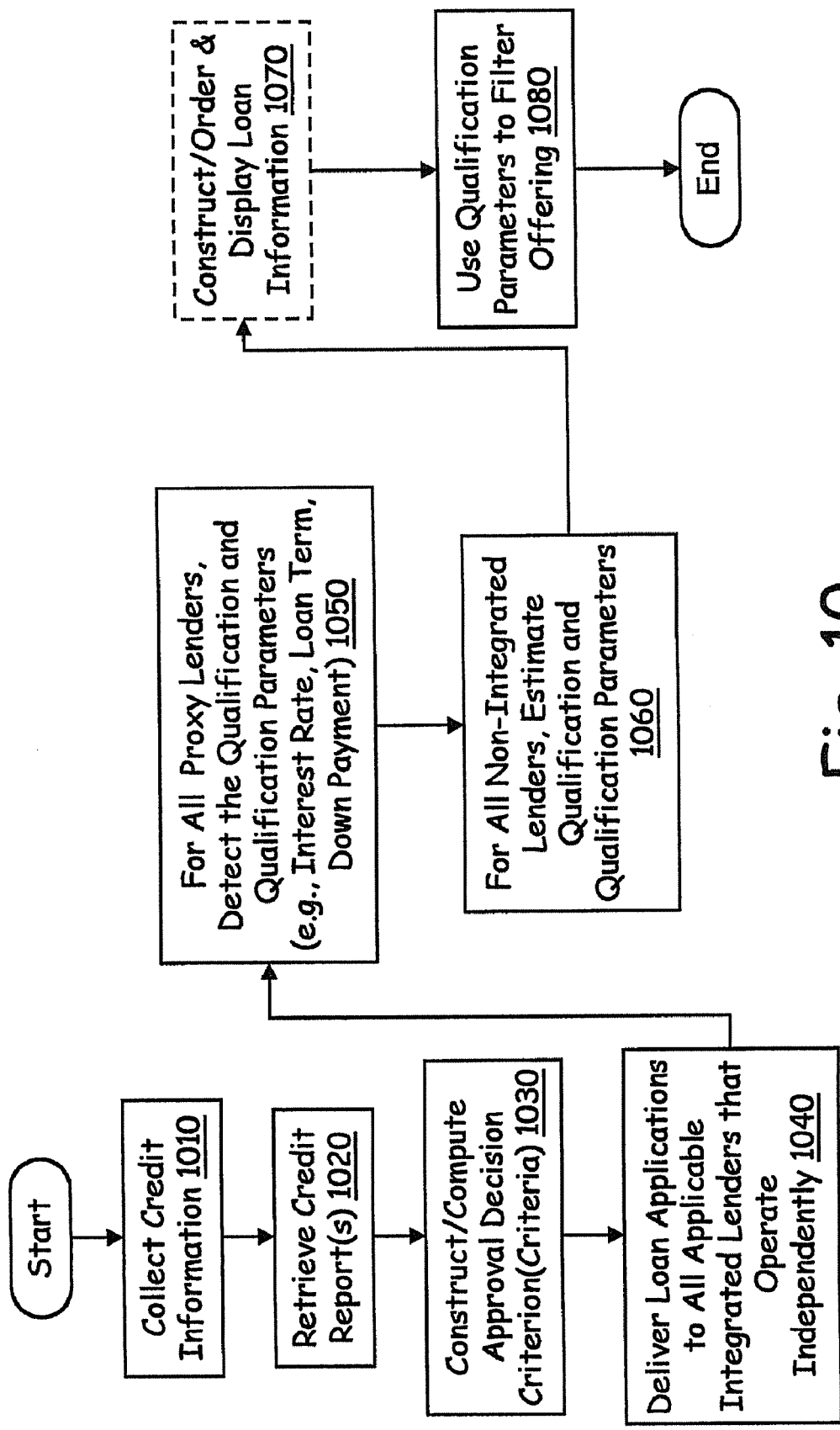
FIG. 10 is a functional block diagram illustrating one embodiment of online, affordability-based filtering performed in accordance with the present invention.

FIG. 10 is a functional block diagram illustrating one embodiment of online, affordability-based filtering performed in accordance with the present invention. In a block 1010, credit information is collected. Subsequently, in a block 1020, a predetermined number of credit reports are retrieved. The credit reports are contained within any of the locations for storage of credit reports in any of the various embodiments of the invention. Then, in a block 1030, an approval decision criterion is generated or constructed. If desired, multiple approval decision criteria may be generated or constructed in the block 1030. Then, in a block 1040, loan applications are delivered to all applicable integrated lenders that operate independently. Those integrated lenders that do not operate independently, but that operate within the system performing the method 1000, automatically receive loan applications corresponding to the buyer.

Then, in a block 1050, qualification and qualification parameters are detected for all proxy lenders. Examples of qualification parameters include interest rate of a loan, the term of a loan, and the down payment to be paid for the loan. For all of the lenders that are not integrated, the qualification and qualification parameters corresponding to those lenders are estimated in a block 1060. If desired, in a block 1070, the loan information is constructed/ordered and displayed to a buyer. Here, the system may display such information as whether the local area network is approved, the particular lenders from whom the buyer can secure financing, and other information pertaining to the securing of a loan for the buyer. Finally, in a block 1080, the qualification parameters that are either detected in the block 1050 or are estimated in the block 1060 are used to filter the offering.

Figure 11:
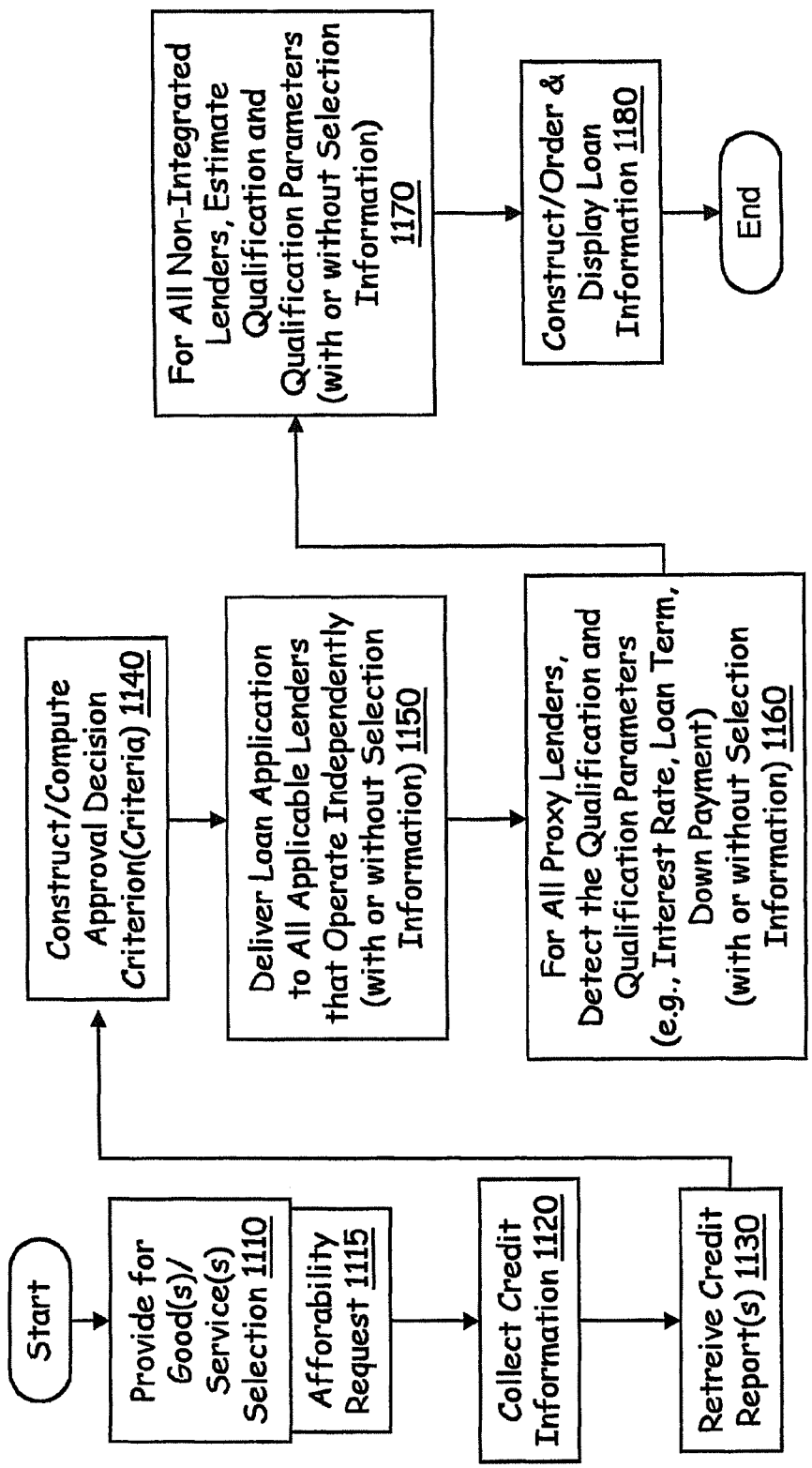
FIG. 11 is a functional block diagram illustrating another embodiment of online, affordability-based filtering performed in accordance with the present invention.

FIG. 11 is a functional block diagram illustrating another embodiment of online, affordability-based filtering performed in accordance with the present invention. The method 1100 provides for the option of selection. In a block 1110, all of the available good(s) and/or service(s) are provided for selection. Then, when an affordability request 1115 is made, the method proceeds to collect credit information in a block 1120. Subsequently, in a block 1130, a predetermined number of credit reports are retrieved.

Then, in a block 1140, an approval decision criterion is generated or constructed. If desired, multiple approval decision criteria may be generated or constructed in the block 1140. Then, in a block 1150, loan applications are delivered to all applicable integrated lenders that operate independently. Those integrated lenders that do not operate independently, but that operate within the system performing the method 1100, automatically receive loan applications corresponding to the buyer. The delivering of the loan applications in the block 1150 may be performed with or without selection information. For example, the information provided to the applicable lenders that operate independently may or may not contain any information pertaining to any selection of good(s) and/or service(s) performed in the block 1110.

Then, in a block 1160, qualification and qualification parameters are detected for all proxy lenders. Examples of qualification parameters include interest rate of a loan, the term of a loan, and the down payment to be paid for the loan. For all of the lenders that are not integrated, the qualification and qualification parameters corresponding to those lenders are estimated in a block 1170. Again, this can be done with or without selection information. Then, in a block 1180, the loan information is constructed/ordered and displayed to a buyer. The system may display such information as whether or not the local area network is approved, the particular lenders for whom the buyer can secure financing, and other information pertaining to the securing of a loan for the buyer. Finally, while not shown in FIG. 11, the qualification parameters that are either detected in the block 1150 or are estimated in the block 1160 may be used to filter the offering.

Figure 12:
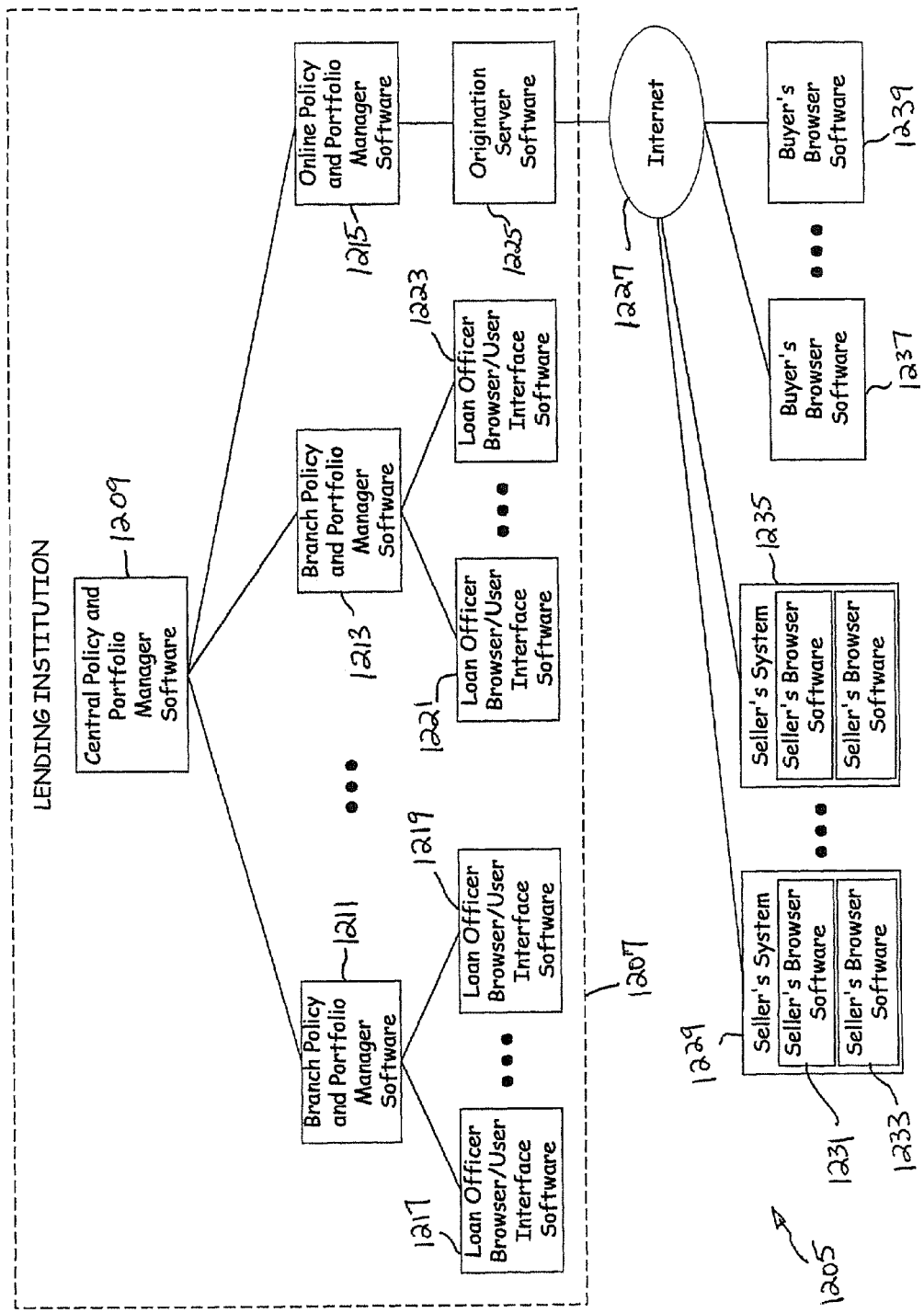
FIG. 12 is a perspective diagram showing the various entities participating in a lending network that also comprises a plurality of seller systems and buyer browser software.

FIG. 12 is a perspective diagram showing the various entities participating in a lending network 1205 that also comprises a plurality of seller systems 1229, 1235 and a buyer's browser software 1237, 1239. The lending network 1205 also comprises several software systems that are part of a lending institution 1207, such as a central policy and portfolio manager software 1209, a branch policy and portfolio manager software 1211, 1213, a loan officer browser/user interface software 1217, 1219, etc., in addition to the plurality of online seller's systems 1229, 1235 and buyer's browser software 1237, 1239.

The central policy and portfolio manager software 1209 is a repository of lending policies, and one or more portfolios of loans/lending papers that are categorized into one or more categories. These categories may be, in one embodiment, A+ for excellent, A for Good, B for Fair, C for Risky, and D for Very Risky. Loan officers attempt to originate loans in such manner to fill their lending portfolios in accordance with lending policies recommended by the central policy and portfolio manager software 1209. Lending institution employees who have the authority to modify lending policies, such as lending managers, modify branch policies in their local branches, as needed and as appropriate, using the branch policy and portfolio manager software 1211.

An origination server software 1225 is used to interact with online sellers and buyers in order to originate online loans and lending papers. The origination server software 1225 uses the services provided by an online policy and portfolio manager software 1215 in screening online loan applications, qualifying online loan applications, and in managing portfolios of online loan applications and lending papers. The online policy and portfolio manager software provides its services under the guidance and control of the central policy and portfolio manager software 1209.

Online buyers can apply for loans and/or determine how much credit they can obtain, using the buyer's browser software 1237, 2139, by filling online credit applications and submitting them for processing by the origination server software 1225. A buyer will, in most cases, receive tentative approval of credit from the origination server software 1225 provided the origination server software 1225 determines that the buyer is credit worthy, based on the information provided by the buyer and based on credit history retrieved from other external systems, such as, for example, a credit reporting facility (not shown). The buyer may also subsequently follow up by visiting with a loan officer at any affiliated or non-affiliated financial institution and inquire about the buyer's credit application. Such loan officer may, using a loan officer browser/user interface software, retrieve the buyer's credit application previously completed by the buyer to determine the type of loans that may be offered to the buyer.

Based on the information retrieved, a loan officer, using the loan officer browser/user interface software 1217, for example, obtains information about possible loans that may be offered to the buyer. The buyer can then select one of the loan offers presented to him/her. In one embodiment, the loan officer then, using the loan officer browser/user interface software 1217 interacts with one or more seller's system 1229, 1235, for example, to identify goods and/or services that the buyer may purchase, using the selected loan and an affordability analysis, for example, as discussed above. The buyer can select one of the goods and/or services for purchase, complete the purchase transaction with the loan officer's browser/user interface software 1217, and make arrangements for picking up the purchased good and/or service from the seller, all such arrangements being facilitated via appropriate screens presented by the loan officer browser/user interface software 1217.

In a related embodiment, the loan officer approves a loan for the buyer, and the loan officer browser/user interface software 1217 automatically creates loan documents and saves them for subsequent retrieval at a seller during a purchase, via a seller's browser software, such as, for example, the seller's browser software 1231 of the seller's system 1229. In this embodiment, the seller, using the seller's browser system 1231, retrieves the approved loan and related documents, and then applies the loan towards the actual good and/or service purchased by the buyer.

In one embodiment, a lender's representative, such as a loan officer, has the ability to populate the data required for the seller's financing and sales documents. Such financing and sales documents are later selectively accessed by the seller's sales personnel at a seller's system during the completion of a purchase by a buyer. In such transactions, the lender may have an agreement with the seller to purchase the paperwork (i.e., loan related documents) contingent upon the buyer accepting the loan terms at the sellers' premises.

Also, loan origination fees may be granted to a lender that originates a buyer, regardless of whether or not the buyer finally selects that lender for financing the purchase. In one embodiment, the lender does not grant an origination fee to a seller when the lender offers a pre-negotiated loan purchase rate for a buyer's loan. Such pre-negotiated loan purchase rate may be established by a lender on a seller specific basis, i.e., such rate may vary by seller.

In one embodiment, a lender may, using the loan officer browser/user interface software 1217, for example, give a seller a premium if the seller convinces a buyer to select a loan of the lender. In another embodiment, the lender buys the seller originated loan, rather than originating the lender's own loan. In fact, via the loan officer browser/user interface software 1217, for example, the lender's employees can initiate a seller's loan and complete the paperwork, and subsequently buy the loan at the completion of the deal by a buyer. In this embodiment, the lending institution, using the branch policy and portfolio manager software 1211 and the loan officer browser/user interface software 1217, completes financing related documents for a buyer (and also saves them) that a seller would ordinarily complete using the seller's system. The lending institution subsequently acquires the loan by accepting such financing related documents (i.e. loan origination papers, etc.) from the seller. In effect, the lending institution creates loan origination documents that a seller would otherwise create for a buyer seeking financing, and subsequently purchases the loan (loan papers) from the seller.

In general, a buyer can enter a credit application online using the buyer's browser software 1237, for example, and then have a loan officer retrieve it using a loan officer browser/user interface software 1217, for example, or have a seller retrieve it using a seller's browser software 1231, for example. Similarly, a buyer can have a loan officer create his/her credit application using the loan officer browser/user interface software 1217 and later have another loan officer (including a loan officer at another, competing lending institution) retrieve it using his/her own browser/user interface software.

Figure 13:
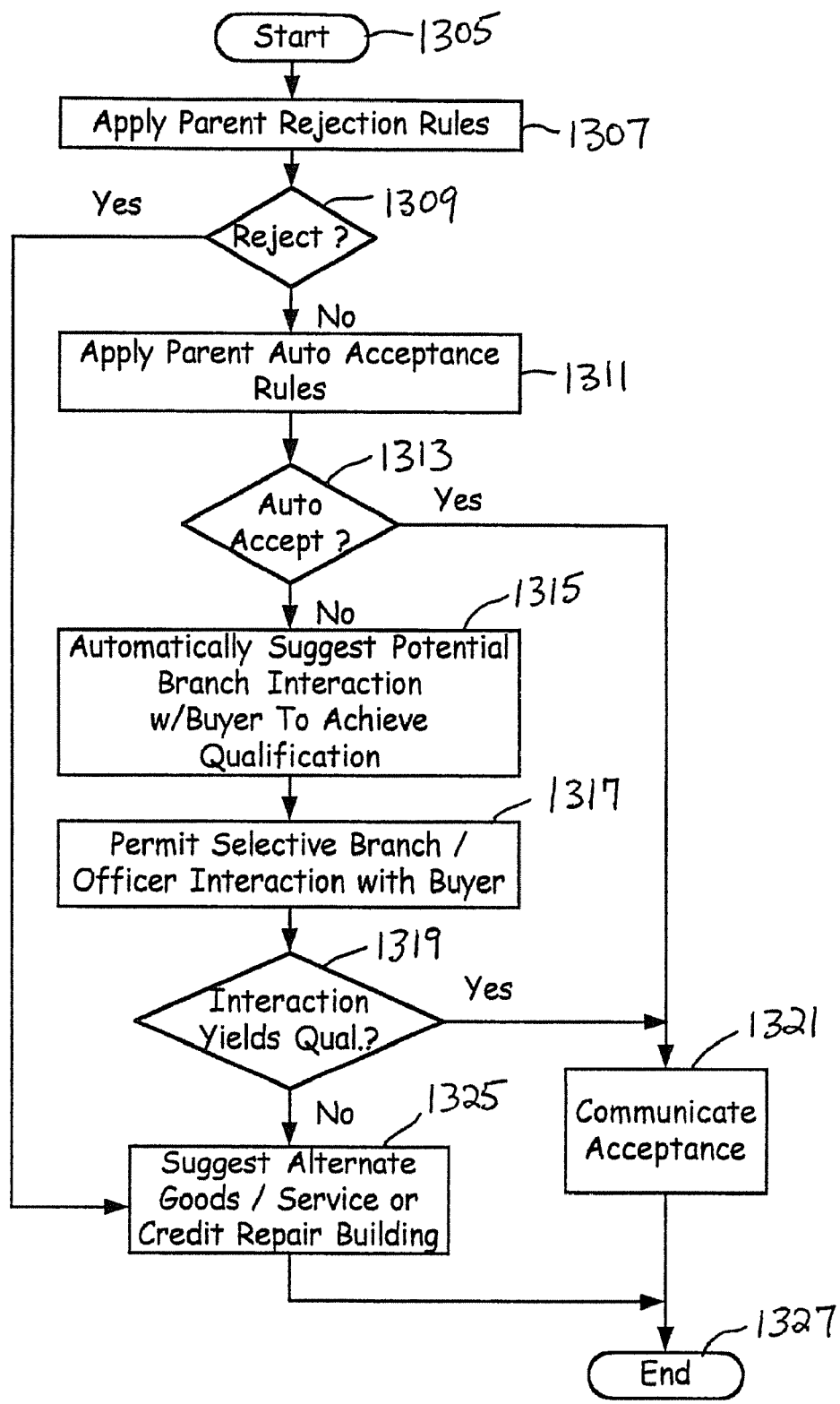
FIG. 13 is an exemplary flow chart depicting loan processing operations applied by a lending institution to a credit application received from a buyer.

FIG. 13 is an exemplary flow chart depicting loan processing operations applied by a lending institution to a credit application received from a buyer. At a block 1305, a credit application from a buyer is retrieved for processing. At a next block 1307, the parent rejection rules are applied to determine if the buyer's loan application should be rejected based on information provided by the buyer and other information retrieved from other sources, such as credit-history, lending policies, etc.

If, at a next decision block 1309, it is determined that the buyer's credit application need not be rejected, then at a next block 1311, the buyer's credit application is subjected to parent auto acceptance rules, where it is determined if the credit application should be accepted based on auto application rules specified by the parent lending institution for loans. If it is determined at a block 1313 that the buyer's loan application should be accepted, then at a next block 1321, the acceptance of the loan application and the decision to offer a loan to the buyer is communicated to the buyer.

If, at a block 1313, it is determined that the buyer cannot be offered financing, then, at a next block 1315, a recommendation is made for the branch of the lending institution to interact with the buyer to attempt to achieve qualification. At a next block 1317, the selective interaction of a branch/loan officer with the buyer is permitted, in an attempt to qualify the buyer. Subsequently, at a next decision block 1319, a determination is made if the branch/loan officer interaction results in qualifying the buyer for a loan. If, at the decision block 1319, it is determined that the buyer does qualify for the loan, then the acceptance of the loan application and the offer of a loan is communicated to the buyer at the next block 1321. Otherwise, or if the buyer is initially rejected at the block 1309, alternate goods/service that the buyer can afford are selectively suggested and/or suggestions to repair the credit profile of the buyer are selectively offered at the next block 1325. Finally, at the next block 1327, the loan processing terminates.

Figure 14:
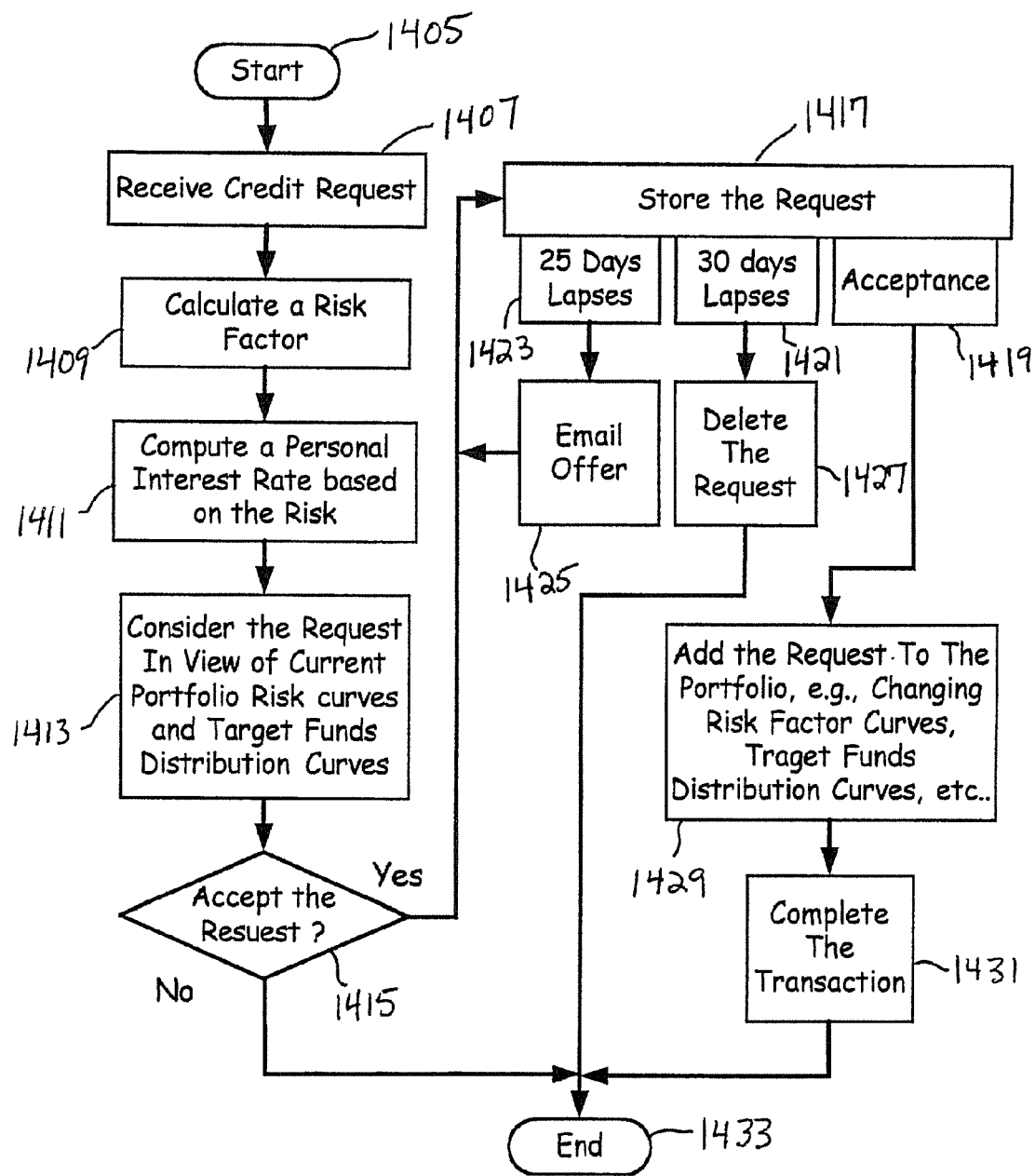
FIG. 14 is a flow chart depicting an exemplary loan portfolio management operation performed by a lending institution while processing credit applications received from buyers.

FIG. 14 is a flow chart depicting an exemplary loan portfolio management operation performed by a lending institution while processing credit applications received from buyers. At a block 1405, processing starts, and at a next block 1307, a credit application from a buyer is retrieved for processing. At a next block 1409, the lending institution calculates a risk factor from the received credit request. At a next block 1411, based on the risk of the credit requested, a personal interest rate for the credit applicant is calculated. At a next block 1413, the credit request is considered in view of current credit portfolio risk curves and target funds distribution curves.

Subsequently, at a decision block 1415, a decision is made to accept the credit request or to reject it. If a decision is made to accept the credit request from the buyer, then, at a next block 1417, an credit offer is made to the buyer and the offer is stored along with the request for a duration of up to 30 days, for example, during which, at the end of, for example, 25 days (block 1423), an email offer is sent as a reminder to the buyer. At the end of the 30 days, the credit offer is deleted at a block 1427 and processing is terminated at the next block 1433.

If, during the 30 day duration of the credit offer, the buyer accepts the credit offer and takes a loan 1419, then, at a next block 1429, the credit request is added to the portfolio of offered credit by the lending institution and credit risks are recalculated with the reevaluation of risk factor curves, target funds distribution curves, etc. Finally, at a block 1431, the credit processing and portfolio management processing is completed before termination of the processing at the block 1433.

If, at the block 1415, it is determined that a credit request by a buyer should not be accepted, then the processing is terminated at the block 1433.

Figure 15:
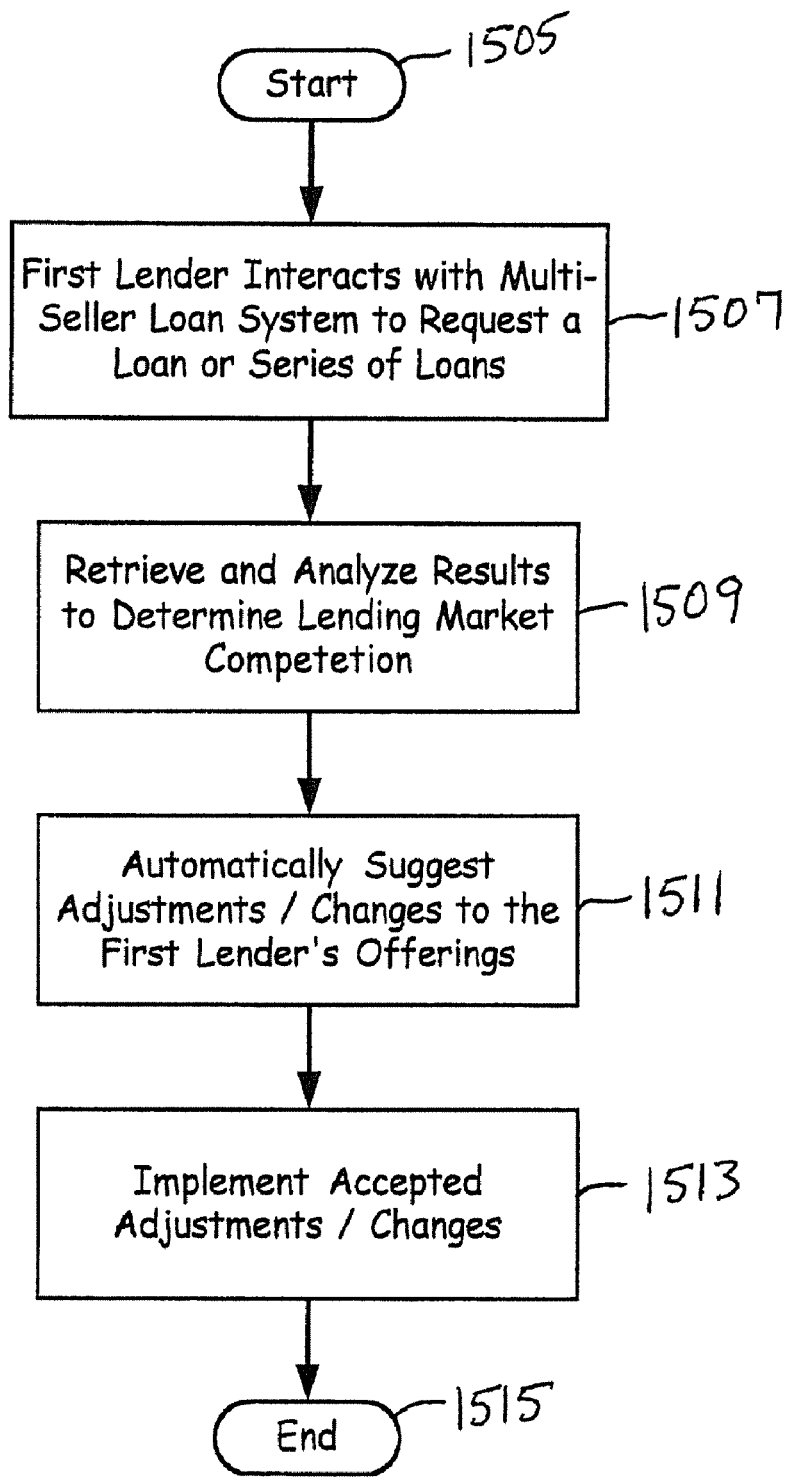
FIG. 15 is a flow chart depicting an exemplary loan offer management operation in a multi-lender loan system where individual lenders can acquire a plurality of credit requests from buyers and where a multi-lender loan system can advise individual lenders on market trends and current parameters of lending activities.

FIG. 15 is a flow chart depicting an exemplary loan offer management operation in a multi-lender loan system where individual lenders can acquire a plurality of credit requests from buyers and where the multi-lender loan system can advise individual lenders on the market trends and the current parameters of lending activities. At a block 1505, processing starts, and at a next block 1507, a first lender among a plurality of lenders, interacts with the multi-lender loan system to request a loan or a series of loans for processing. At a next block 1509, the multi-lender loan system retrieves information on recently offered loans (and related market information) and analyzes the results to determine lending market competition. Later, at a next block 1511 the multi-lender loan system automatically suggests adjustments/changes to the first lender's credit offerings. In a block 1513, the multi-lender loan system implements the suggested adjustments/changes that are accepted by the first lender. Finally, processing stops at a next block 1415.

Figure 16:
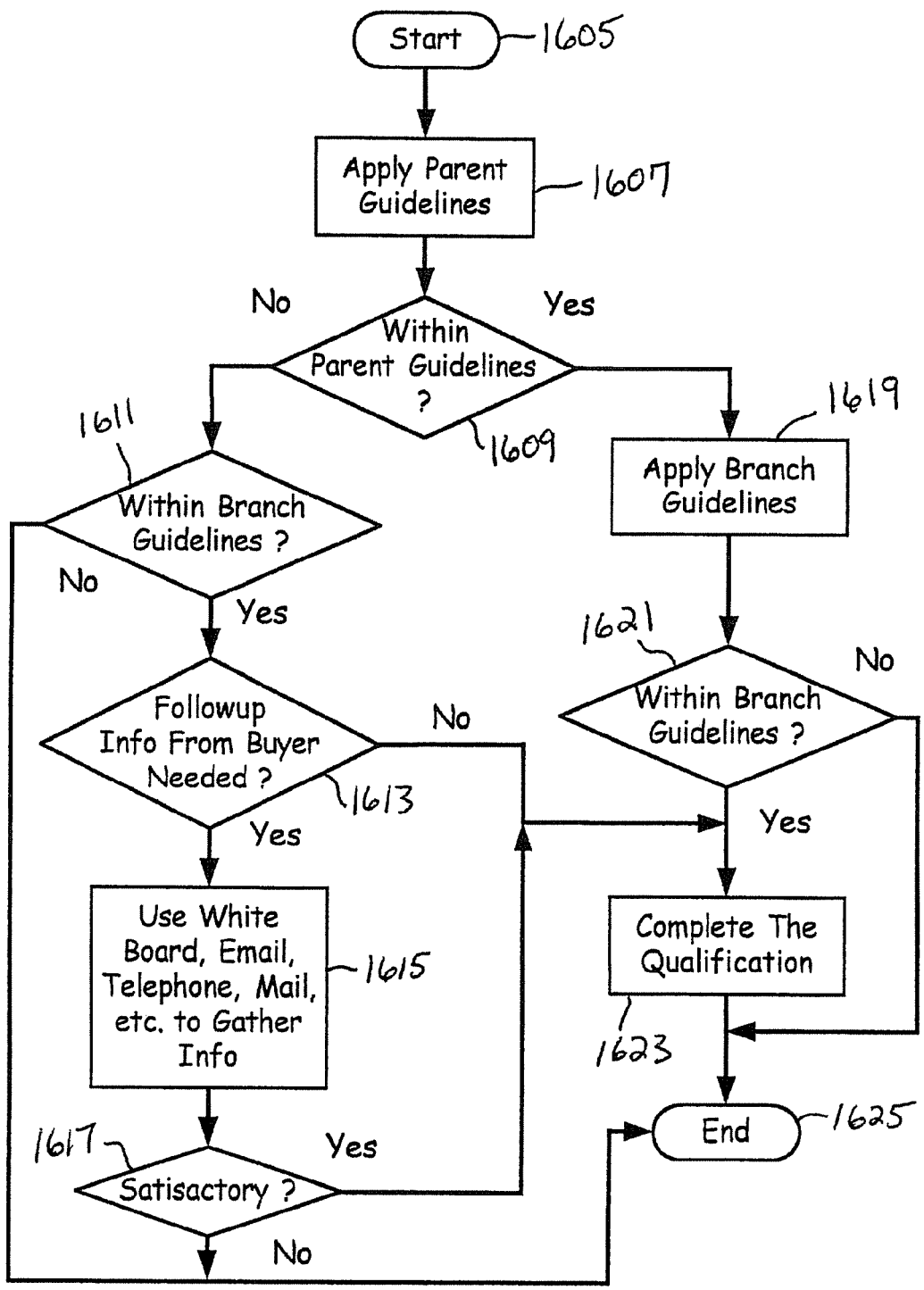
FIG. 16 is a flow chart depicting an exemplary loan processing operation by a lending institution where individual branch offices can implement different lending practices and manipulate different lending parameters than those specified by their parent organizations.

FIG. 16 is a flow chart depicting an exemplary loan processing operation by a lending institution where individual branch offices can implement different lending practices and manipulate different lending parameters than those specified by their parent organization(s). At a block 1605, processing starts, and at a next block 1607, a branch of a lending institution applies parent guidelines to individual credit applications. Later, at a decision block 1609, it determines if the credit applications are within the parent guidelines. If they are, then at the next decision block 1611, an attempt is made to determine if they are within the branch guidelines. If they are not, processing terminates at the next block 1625.

If, at the decision block 1611, credit applications are determined to be within branch guidelines, then, at a next decision block 1613, an attempt is made to determine if any additional information is needed from the applicant (the buyer) in order to satisfactorily complete the loan qualification and offer the credit. If the credit applications are determined to be qualified and no additional information is necessary, then, at a next block 1623, the qualification is completed and processing is terminated at a subsequent block 1625.

If, at the decision block 1613, it is determined that follow up information from buyer is needed, then, at a next block 1615, information is gathered from associated credit applicant(s) using white board, email, telephone calls, mail, etc., as appropriate. Later, at a next block 1617, if information provided by credit applicants is determined to be satisfactory, then at a next block 1623, the qualification is completed and processing is terminated at a subsequent block 1625. Otherwise, processing is terminated at the block 1625.

If, at the decision block 1609, it id determined that the credit application(s) are within parent organization guidelines, then, at a next block 1619, branch guidelines are applied, and at a next decision block 1621, an attempt is made to determine if the credit application(s) are within branch guidelines. If they are determined to comply with branch guidelines, then at a next block 1623, the qualification is completed and processing is terminated at a subsequent block 1625. Otherwise, processing is terminated at the block 1625.

Figure 17:
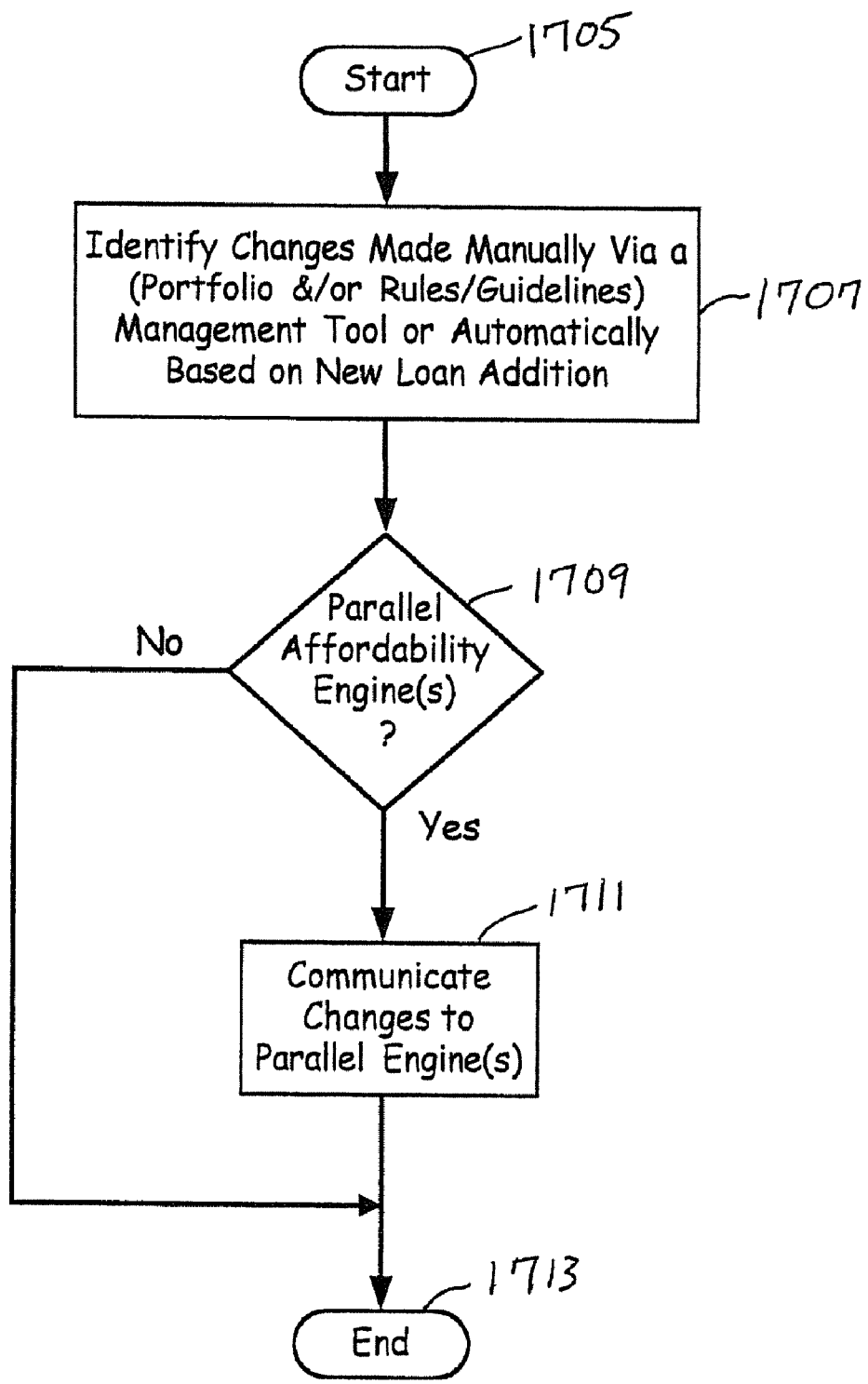
FIG. 17 is a flow chart depicting exemplary interactions between parallel affordability engines and the ability to communicate changes among and between them.

FIG. 17 is a flow chart depicting exemplary interactions between parallel affordability engines and the ability to communicate changes among and between them. At a block 1705, processing starts, and at a next block 1707, changes in loan portfolios/parameters due to the processing of new credit applications by the lending institution are evaluated. These changes may have occurred manually via a management tool used by lender personnel or automatically based on new loan addition. Also, since individual branch offices can implement different lending practices and manipulate different lending parameters than those specified by their parent organizations in the institution, the affordability engines of these individual branch offices can be selectively synchronized, if necessary.

At a next block 1709, the availability of parallel affordability engines is determined. If parallel affordability engines are operating, then, at a next block 1711, the changes are communicated to the parallel engines before terminating the processing at a next block 1713.

Figure 18:
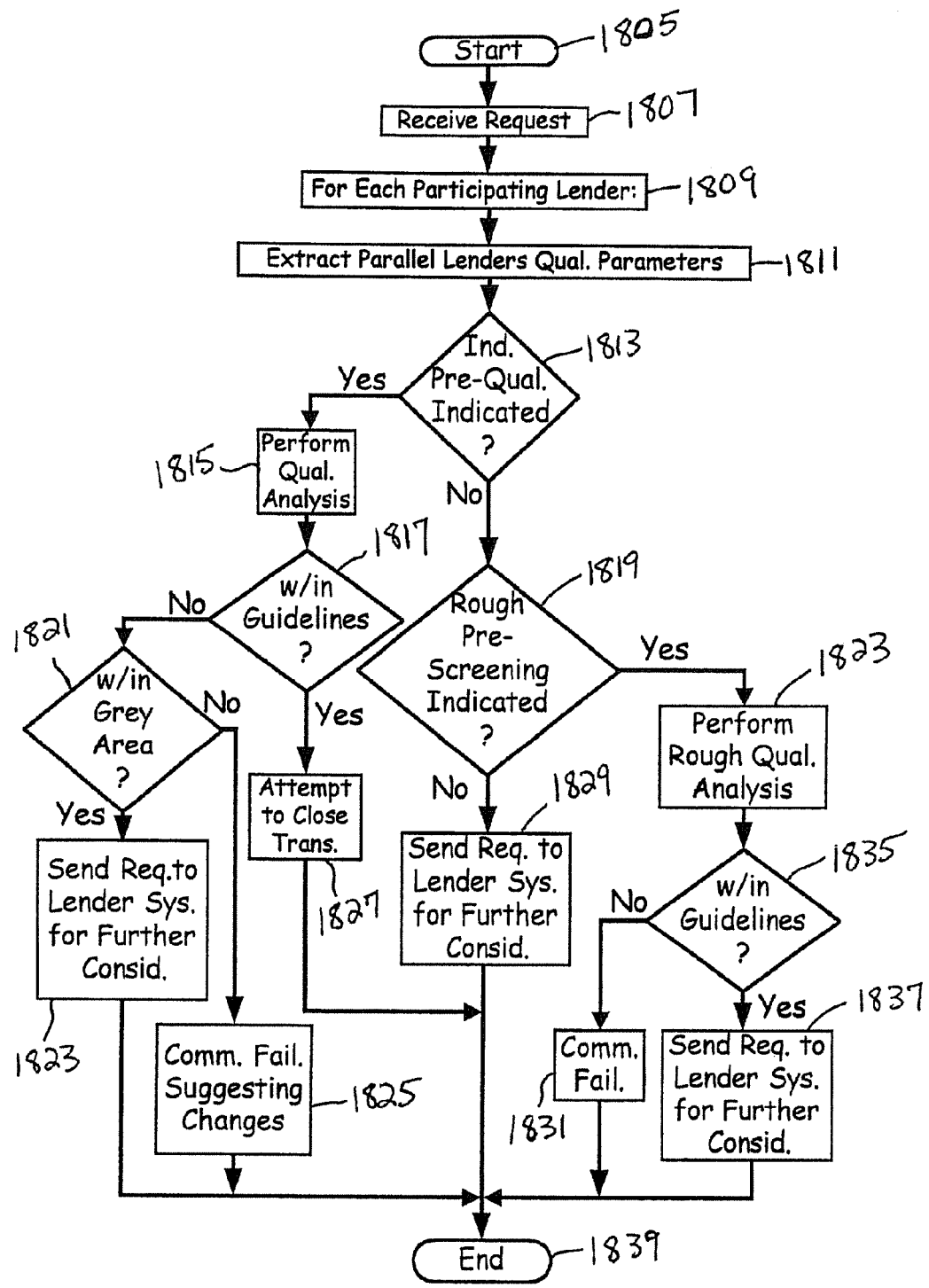
FIG. 18 is a flow chart depicting exemplary loan processing in a multi-lender credit environment where different participating lenders employ different qualification parameters and policies.

FIG. 18 is a flow chart depicting exemplary loan processing in a multi-lender credit environment where different participating lenders employ different qualification parameters and policies. At a block 1805, processing starts, and at a next block 1807, credit requests are received. Then, at a next block 1809, parallel processing of the credit request is initiated for each participating lender, starting with the extraction of parallel lenders qualification parameters at a next block 1811.

At a block 1813, the individual lenders' requirement to execute pre-qualification processing is determined. If it is determined to be necessary, pre-qualification analysis is performed at a next block 1815 to determine if the credit request is within guidelines at a subsequent decision block 1817. Otherwise, the need to execute a rough pre-screening of credit requests is determined at a next decision block 1819. If a rough pre-screening is determined to be necessary, then a rough qualification analysis is performed at a next block 1833 and subsequently, at a decision block 1835, it is determined if the credit is within the guidelines for credit approval. If it is determined that the credit request is within guidelines for further consideration by lender, then, at a block 1837, the credit request is sent to a lender's system (or multiple lenders' systems) for further consideration and processing is terminated at the last block 1839. Otherwise, the failure to qualify for credit is communicated to the requesting credit applicant at a next block 1831 before terminating processing at the block 1839.

If, at the decision block 1819, rough pre-screening is determined to not be necessary, then, at a next block 1829, the credit request is sent to a lender's system (or multiple lenders' systems) for further consideration, and processing is terminated at the last block 1839.

If, at the decision block 1817, subsequent to pre-qualification analysis, the credit application is determined to be within guidelines, then an attempt to close the transaction is made at a next block 1827 before terminating processing at the block 1839. Otherwise, an attempt is made at a next decision block 1821 to determine if the credit application is within a gray area of parameters, and if so, then, at a block 1823, the credit request is sent to lender's system (or multiple lenders' systems) for further consideration and processing is terminated at the last block 1839. Otherwise, the failure to qualify for credit is communicated to the requesting credit applicant at a next block 1831, along with suggested changes to improve the buyer's credit situation, before terminating processing at the block 1839.

Figure 19:
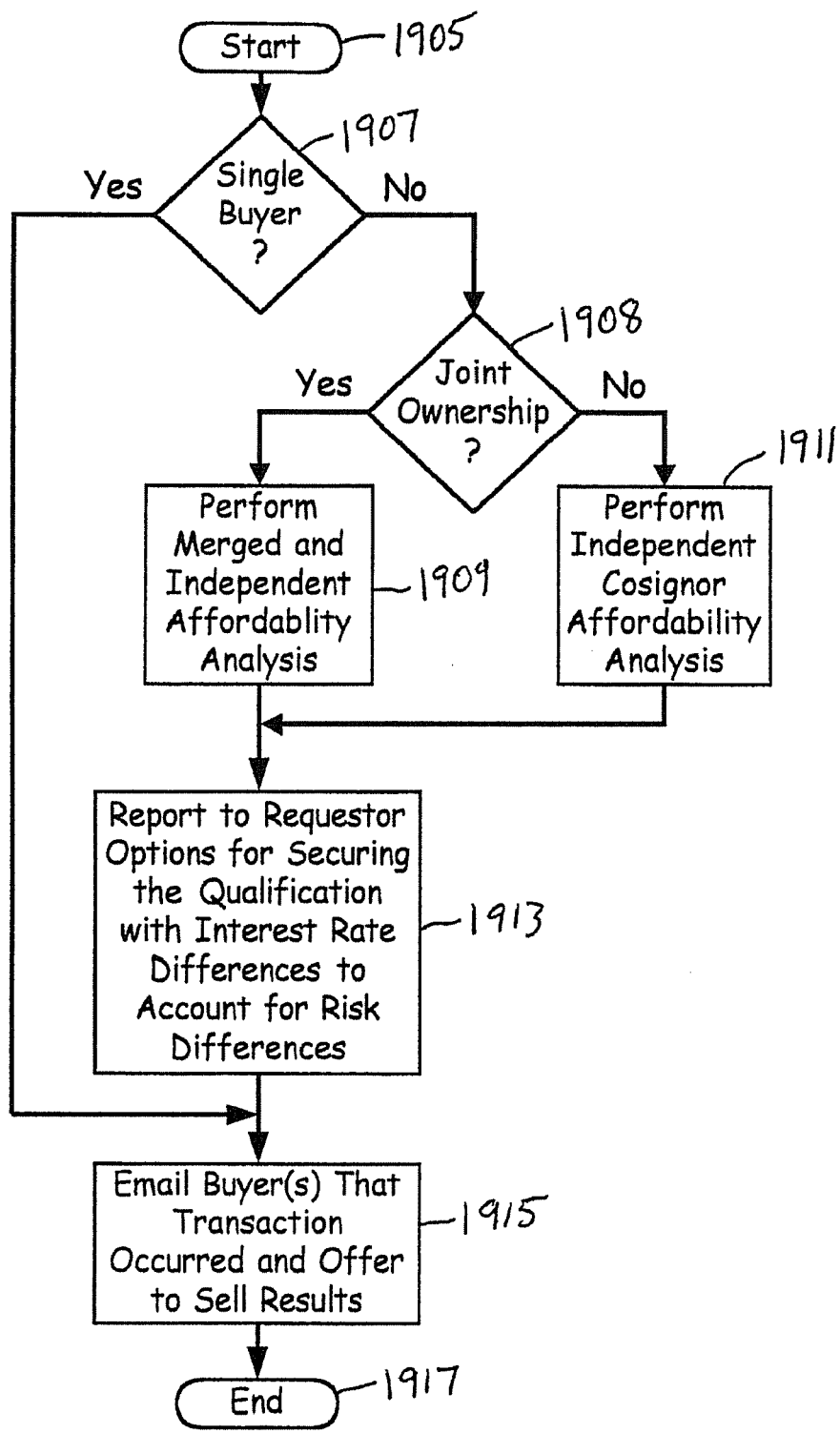
FIG. 19 is a flow chart depicting exemplary loan processing in a multi-lender credit environment where some credit applicants apply for credit with cosigners in an attempt to improve their chances of acquiring loans from lenders.

FIG. 19 is a flow chart depicting exemplary loan processing in a multi-lender credit environment where some credit applicants apply for credit with cosigners in an attempt to improve their chances of obtaining loans from lenders. At a block 1905, processing starts, and at a next decision block 1907, credit requests are received and the determination is made if the buyer is a single buyer or one seeking joint ownership. If the buyer is determined to be a single buyer, then, at a next block 1915, the lender emails the buyer information regarding the credit processing along with an offer to sell the results of the credit processing activities to the buyer, before terminating the processing at a next block 1917.

It at the decision block 1907, it is determined that the buyer is not a single buyer, then, at a next block 1908, it is determined if the buyers are attempting a joint ownership. If the buyers are attempting joint ownership, then, at a next block 1909, both merged and independent affordability analyses are performed for all buyers listed. Otherwise, assuming a co-signor based credit request (no joint ownership), an independent affordability analysis of the co-signor is performed at a next block 1911. In either situation, a report is generated, at a next block 1913, detailing the various credit options, the qualification requirements and associated loan rates for the buyer, along with an explanation of interest rate differences due to differences in the risk profiles.

Subsequently, at a next block 1915, the lender emails the buyer an offer to sell the report created at the block 1913, before terminating the processing at a next block 1917.

Figure 20:
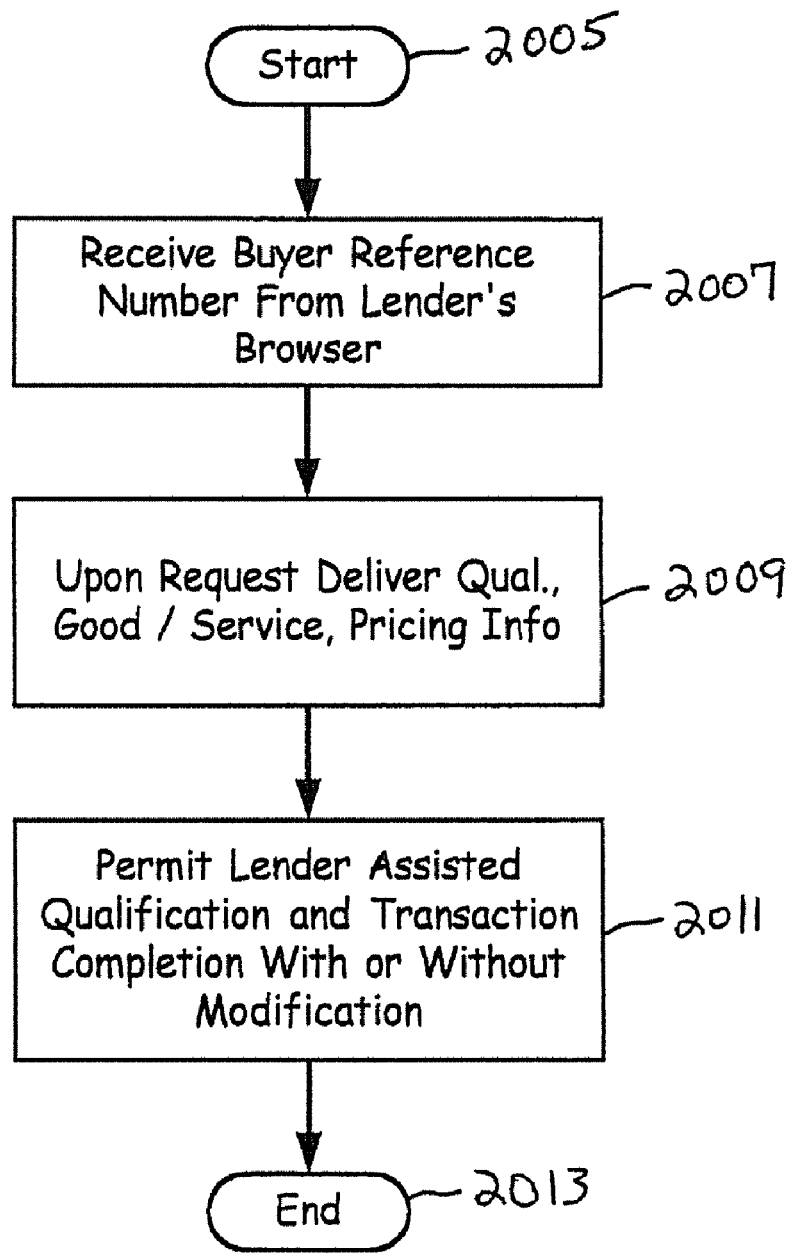
FIG. 20 is a flow chart depicting functionality of a multi-lender credit system for assisting a lender in completing loan qualification and transaction completion for a previously initiated transaction session.

FIG. 20 is a flow chart depicting functionality of a multi-lender credit and/or affordability system for assisting a lender in completing loan qualification and transaction completion for a previously initiated transaction session. At a block 2005, processing starts, and at a next block 2007, the system receives a buyer's reference number from a lender's browser. The system uses the reference number to obtain previously stored buyer profile information. Upon request, the system delivers information about qualifications for credit, product and pricing information for goods/services, etc. Then, at a next block 2011, the system permits lender assisted qualification and transaction completion at a lender's site, with or without modification to the buyer's profile information, i.e., the loan or good/service selected, for example. Finally, the processing terminates at the block 2013.

In view of the above detailed description of the present invention and associated drawings, other modifications and variations will now become apparent to those skilled in the art. It should also be apparent that such other modifications and variations may be effected without departing from the spirit and scope of the present invention.

The invention claimed is:

1. A credit management system comprising:
    at least one web page presenting a credit application;
    at least one credit approval criterion;
    a credit approval engine;
    a server system of a first entity responding to client input regarding the credit application by causing the credit approval engine to analyze the credit application based on the at least one credit approval criterion, the server automatically communicating an approval of the credit application to the client if the credit application meets the at least one credit approval criterion; and
    the server system responding to further input from or approved by the client, by communicating the approval or the credit application to another server system or computing device of a second entity to facilitate a transaction, based on the approved credit, by the client with the second entity.

2. The credit management system of claim 1 wherein a risk factor is calculated based on the credit application and compared against at least one risk guideline to make a determination whether to approve the credit application.

3. The credit management system of claim 1 wherein the server system obtains credit report information using at least a portion of the credit application, and wherein the credit approval engine uses at least a portion of the credit report information and at least a portion of the credit application to make a determination whether to approve the credit application.

4. The credit management system of claim 1 wherein the server system communicates an indication of the approval by one of an email or at least one web page communicated from the server system.

5. The credit management system of claim 4 wherein the indication of the approval comprises a credit offer.

6. The credit management system of claim 5 wherein the server system stores the credit application and the indication of the approval in an approval database.

7. The credit management system of claim 6 wherein the credit application is deleted from the approval database after a predetermined time period if the server system does not receive an acceptance within the predetermined time period.

8. The credit management system of claim 7 wherein a risk factor is calculated based on the credit application and compared against at least one risk guideline to make a determination whether to approve the credit application, and wherein the server system causes, in response to receipt of a communication of an acceptance, the at least one risk guideline to be updated based on the risk factor calculated.

9. A method of facilitating online financing comprising:
    delivering, by a server system having a credit approval engine, a credit application for presentation on a computing device of a client;
    receiving a completed credit application from the computing device of the client;
    retrieving, by the server system, at least one credit approval criterion;
    determining, by the credit approval engine, whether the credit application meets the at least one credit approval criterion;
    communicating, automatically in real time by the server system, an approval of the application to the computing device of the client if the credit approval engine determines that the credit application meets the at least one credit approval criterion; and
    communicating, by the server and responsive to further input from or approved by the client, the approval or the credit application to another server system or computing device of a second entity to facilitate a transaction, based on the approval, by the client with the second entity.

10. The method of claim 9 wherein the determining comprises calculating a risk factor based on the credit application and comparing the calculated risk factor against at least one risk guideline.

11. The method of claim 9 further comprising obtaining, by the server system, credit report information from a second server system using at least a portion of the credit application, and wherein the determining uses at least a portion of the credit report information, at least a portion of the credit application and the credit approval criterion.

12. The method of claim 9 further comprising causing an indication of the approval to be displayed on the computing device of the client.

13. The method of claim 12 wherein the indication comprises a credit offer, and further comprising receiving, by the server system, an acceptance of the credit offer.

14. The method of claim 9 wherein the communicating to the computing device of the client is by one of an email or at least one web page communicated from the server system.

15. The method of claim 9 further comprising storing, by the server system, the credit application in an approval database.

16. The method of claim 15 further comprising deleting, by the server system, the credit application from the approval database after a predetermined time period if the server system does not receive an acceptance within the predetermined time period.

17. The method of claim 16 wherein the determining comprises calculating a risk factor based on the credit application and comparing the calculated risk factor against at least one risk guideline, and further comprising updating the at least one risk guideline based on the risk factor calculated.

* * * * *